(12) United States Patent
Ngamou et al.

(10) Patent No.: US 11,786,870 B2
(45) Date of Patent: Oct. 17, 2023

(54) CMS MEMBRANE, METHOD FOR THE PRODUCTION THEREOF AND USE THEREOF

(71) Applicant: Forschungszentrum Jülich GmbH, Jülich (DE)

(72) Inventors: Patrick Tchoua Ngamou, Jülich (DE); Mariya E. Ivanova, Jülich (DE); Wilhelm Albert Meulenberg, Vijlen (NL); Olivier Guillon, Jülich (DE)

(73) Assignee: Forschungszentrum Jülich GmbH, Jülich (DE)

( * ) Notice: Subject to any disclaimer, the term of this patent is extended or adjusted under 35 U.S.C. 154(b) by 272 days.

(21) Appl. No.: 17/277,368

(22) PCT Filed: Sep. 16, 2019

(86) PCT No.: PCT/EP2019/074625
§ 371 (c)(1),
(2) Date: Mar. 18, 2021

(87) PCT Pub. No.: WO2020/058154
PCT Pub. Date: Mar. 26, 2020

(65) Prior Publication Data
US 2022/0032237 A1    Feb. 3, 2022

(30) Foreign Application Priority Data

Sep. 21, 2018  (DE) .................. 102018216163.1

(51) Int. Cl.
*B01D 67/00*    (2006.01)
*B01D 53/22*    (2006.01)
(Continued)

(52) U.S. Cl.
CPC ....... *B01D 67/0067* (2013.01); *B01D 53/228* (2013.01); *B01D 67/0041* (2013.01);
(Continued)

(58) Field of Classification Search
None
See application file for complete search history.

(56) References Cited

U.S. PATENT DOCUMENTS 6,187,987 B1 * 2/2001 Chin ................ C07C 7/144
585/818
2006/0288677 A1   12/2006 Kaigawa et al.
(Continued)

FOREIGN PATENT DOCUMENTS

CA         2557599        9/2005
KR    1020180007394   *  1/2018   ......... B01D 71/021
(Continued)

OTHER PUBLICATIONS

Ma, Xiaoli et al. "Ultrathin Carbon Molecular Sieve Membrane for Propylene/Propane Separation", AIChE Journal, 2016, vol. 62, No. 2, pp. 491-499. (Year: 2016).*
(Continued)

*Primary Examiner* — Jason M Greene
(74) *Attorney, Agent, or Firm* — Pearne & Gordon LLP

(57) ABSTRACT

Disclosed are a CMS membrane, characterized in that it is obtainable by pyrolysis of a polyimide composed of the monomers 1-(4-aminophenyl)-1,3,3-trimethyl-2H-inden-5-amine and 5-(1,3-dioxo-2-benzofuran-5-carbonyl-2-benzofuran-1,3-dione of the following formulae:
(Continued)

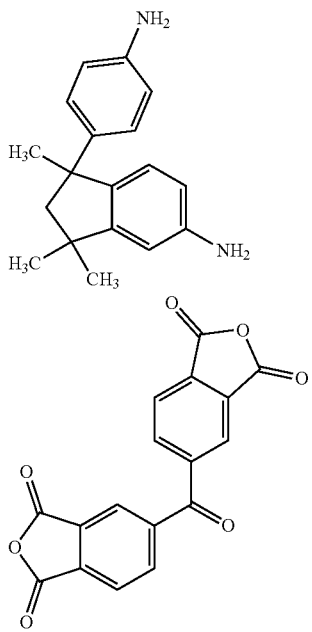

preferably by pyrolysis of the polyimide having the CAS number 62929-02-6, and a supported CMS membrane comprising a CMS membrane obtainable from a polyimide by pyrolysis and a porous support, characterized in that a mesoporous intermediate layer is provided between the CMS membrane and the porous support.

Further disclosed are a process for preparing the supported membrane, the use of the membranes for separating gas mixtures or liquid mixtures, an apparatus for gas separation or for liquid separation, and the use of the polyimide for preparing a CMS membrane by pyrolysis.

9 Claims, 15 Drawing Sheets

(51) Int. Cl.
B01D 69/10 (2006.01)
B01D 69/12 (2006.01)
B01D 71/02 (2006.01)
C02F 1/44 (2023.01)
B01D 69/04 (2006.01)

(52) U.S. Cl.
CPC ....... B01D 67/0048 (2013.01); B01D 69/105 (2013.01); B01D 69/12 (2013.01); B01D 71/021 (2013.01); B01D 71/025 (2013.01); C02F 1/448 (2013.01); B01D 69/04 (2013.01); B01D 2256/16 (2013.01); B01D 2256/245 (2013.01); B01D 2257/50 (2013.01); B01D 2257/80 (2013.01); B01D 2323/08 (2013.01); B01D 2323/10 (2013.01); B01D 2325/02 (2013.01)

(56) References Cited

U.S. PATENT DOCUMENTS

2010/0083837 A1* 4/2010 Ichikawa ........... B01D 67/0067 96/6
2011/0100211 A1 5/2011 Kiyono et al.
2012/0079943 A1* 4/2012 Voss ............. B01D 53/228 96/11
2013/0152793 A1 6/2013 Bhuwania et al.
2015/0231572 A1* 8/2015 Vankelecom ...... B01D 67/0011 427/337
2015/0290596 A1 10/2015 Koros et al.
2016/0346740 A1* 12/2016 Koros ............... B01D 71/021
2017/0137350 A1* 5/2017 Weiss ............... B01D 71/021

FOREIGN PATENT DOCUMENTS

WO 2016/196595 12/2016
WO 2017/165098 9/2017

OTHER PUBLICATIONS

English language machine translation for KR 1020180007394. Retrieved from translationportal.epo.org on Feb. 8, 2023. (Year: 2023).*
English Translation of International Preliminary Report on Patentability for International Application No. PCT/EP2019/074625 dated Apr. 9, 2021, 22 pages.
International Search Report for International Application No. PCT/EP2019/074625 dated Jan. 24, 2020, 3 pages.
Ma et al., "Ultrathin carbon molecular sieve membrane for propylene/propane separation," AIChE Journal, Feb. 2016, pp. 491-499, vol. 62, No. 2, 9 pages.
Robeson, "The upper bound revisited," Journal of Membrane Science, 320, 2008, pp. 390-400, 11 pages.
Caro et al., "Zeolite Membranes—Status and Prospective," Advances in Nanoporous Materials, 2009, vol. 1, Chapter 1, 96 pages.
Scholes et al., "Carbon Dioxide Separation through Polymeric Membrane Systems for Flue Gas Applications," Recent Patents on Chemical Engineering, 2008, 1, pp. 52-66, 16 pages.
Chiu et al., "Post-synthesis defect abatement of inorganic membranes for gas separation," Journal of Membrane Science, 377 (2011), pp. 182-190, 9 pages.
Chen et al., "Preparation of high-flux y-alumina nanofiltration membranes by using a modified sol-gel method," Microporous and Mesoporous Materials, 214 (2015), pp. 195-203, 9 pages.
Ma et al., "Gamma-Alumina Supported Carbon Molecular Sieve Membrane for Propylene/Propane Separation," I&EC Research, 52, 2013, pp. 4297-4305, 9 pages.
Tseng et al., "Enhanced H2/CH4 and H2/CO2 separation by carbon molecular sieve membrane coated on titania modified alumina support: Effects of TiO2 intermediate layer preparation variables on interfacial adhesion," Journal of Membrane Science, 510 (2016), pp. 391-404, 14 pages.
Richter et al., "High-Flux Carbon Molecular Sieve Membranes for Gas Separation," Communications, Angew. Chem. Int. Ed., 2017, 56, pp. 7760-7763, 18 pages.
Ellis, "Aus Polymers, A Property Database, 2nd ed.," Ray Smith Ed., CRC Press, 2009, 2 pages.
Favvas et al., "Preparation, characterization and gas permeation properties of carbon hollow fibers membranes based on Matrimid 5218 precursor," Journal of Materials Processing Technology, 2007, pp. 102-110, 9 pages.
Tin et al., "Polyimide-Carbonized Membranes for Gas Separation: Structural, Composition, and Morphological Control of Precursors," Separation & Purification Reviews, 2006, 35: 4, pp. 285-318, 35 pages.
Eckmann et al., "Probing the Nature of Defects in Graphene by Raman Spectroscopy," Nano Letters, 2012, 12, pp. 3925-3930, 6 pages.
Li et al., "Preparation and gas separation performance of supported carbon membranes with ordered mesoporous carbon interlayer," Journal of Membrane Science, 450 (2014), pp. 469-477, 9 pages.
Park et al., "Relationship between chemical structure of aromatic polyimides and gas permeation properties of their carbon molecular sieve membranes," Journal of Membrane Science, 229 (2004), pp. 117-127, 11 pages.

(56) References Cited

OTHER PUBLICATIONS

Rodrigues et al., "Preparation and characterization of carbon molecular sieve membranes based on resorcinol-formaldehyde resin," Journal of Membrane Science, 459 (2014), pp. 207-216, 26 pages.

Roy et al., "Preparation of carbon molecular sieve membrane derived from phenolic resin over macroporous clay-alumina based support for hydrogen separation," J Porous Mater, 23 (2016), pp. 1653-1662, 10 pages.

Shah et al., "Pervaporation of alcohol-water and dimethylformamide-water mixtures using hydrophilic zeolite NaA membranes: mechanisms and experimental results," Journal of Membrane Science, 179 (2000), pp. 185-205, 21 pages.

Sommer et al., "Influence of operation parameters on the separation of mixtures by pervaporation and vapor permeation with inorganic membranes. Part 1: Dehydration of solvents," Chemical Engineering Science, 60 (2005), pp. 4509-4523, 15 pages.

Tanaka et al., "Pervaporation dehydration performance of microporous carbon membranes prepared from resorcinol/formaldehyde polymer," Journal of Membrane Science, 379 (2011), pp. 52-59, 8 pages.

Tanco et al., "Composite-alumina-carbon molecular sieve membranes prepared from novolac resin and boehmite. Part I: Preparation, characterization and gas permeation studies," International Journal of Hydrogen Energy, 40 (16), 2015, pp. 5653-5663, 25 pages.

Elshof et al., "Transport mechanisms of water and organic solvents through microporous silica in the pervaporation of binary liquids," Microporous and Mesoporous Materials, 65 (2003), pp. 197-208, 12 pages.

Tseng et al., "Influence of support structure on the permeation behavior of polyetherimide-derived carbon molecular sieve composite membrane," Journal of Membrane Science, 405-406 (2012), pp. 250-260, 11 pages.

Van Gemert et al.,"Newly developed ceramic membranes for dehydration and separation of organic mixtures by pervaporation," Journal of Membrane Science, 105 (1995), pp. 287-291, 5 pages.

Van Gestel et al., "New types of graphene-based membranes with molecular sieve properties for He, H2 and H2O," Journal of Membrane Science, 554 (2018), pp. 378-384, 7 pages.

Wei et al., "Preparation of supported carbon molecular sieve membrane from novolac phenol-formaldehyde resin," Journal of Membrane Science, 303 (2007), pp. 80-85, 6 pages.

Wey et al., "Improving the mechanical strength and gas separation performance of CMS membranes by simply sintering treatment of $\alpha$-Al2O3 support," Journal of Membrane Science, 453 (2014), pp. 603-613, 11 pages.

Yoshimune et al., "Alcohol dehydration by pervaporation using a carbon hollow fiber membrane derived from sulfonated poly(phenylene oxide)," Journal of Membrane Science, 425-426 (2013), pp. 149-155, 7 pages.

\* cited by examiner

PRIOR ART

CMS MEMBRANE, METHOD FOR THE PRODUCTION THEREOF AND USE THEREOF

The present invention relates to an ultrathin defect-free carbon membrane suitable for the separation of gases as well as for the separation of liquids, a process for the preparation of this membrane, and its use for the separation of gases or liquids.

TECHNICAL BACKGROUND

Membrane technology is considered an energy-efficient alternative for separating numerous gases and solvent mixtures, compared to mature technologies such as pressure swing adsorption and cryogenic distillation. Specific examples include separation of hydrogen from gasification and separation of hydrocarbons, upgrading of biogas and landfill gas, exhaust-gas treatment, methane purification, and dehydration of organic solvents. In this context, inorganic microporous membranes have been intensively investigated due to their thermal and chemical stability. Membrane candidates include, for example, silica, zeolites, carbon molecular sieves, and graphene/graphene oxide membranes.

The membrane separation is shown schematically in FIG. 20.

There are three mechanisms by which membrane separation can basically proceed, namely by Knudsen diffusion, by the molecular sieve effect or by solution diffusion. These are shown schematically in FIG. 21.

Polymeric membranes are generally non-porous, and therefore gas permeation through them generally proceeds by the solution-diffusion mechanism. This is based on the solubility of specific gases in the membrane and their diffusion through the dense membrane matrix. In the case of polymeric membranes, a distinction is also made between rubber-like membranes, which operate above the glass transition temperature Tg of the polymer, and glass-like membranes, which operate below Tg.

Knudsen separation is based on certain gas molecules passing through membrane pores small enough to prevent all of the gas from passing through.

The molecular sieve mechanism relies on size exclusion to separate gas mixtures. Pores within the membrane have a strictly controlled size relative to the kinetic diameter of the gas molecules. This allows the smaller gas molecules to diffuse at much higher rates than the larger gas molecules.

Carbon molecular sieve membranes (hereinafter referred to as CMS membranes) as one of the most promising inorganic microporous membranes have recently received increased attention since they exhibit unique properties such as easy fabrication and excellent stability under severe conditions. Carbon molecular sieve membranes are typically prepared by pyrolysis (carbonization) of various types of polymer precursors in vacuum or inert atmosphere. After decomposition of the thermally unstable polymeric components, a thermally stable carbon framework is formed, which is composed of micropores (0.7-2 nm) connected by ultra-micropores (smaller than 0.7 nm).

Unlike crystalline molecular sieves such as zeolites, CMS membranes are essentially amorphous, and their ultra-pore size is not uniform within the membrane. CMS membranes are chemically very inert. They have $sp^2$ and $sp^3$ bonds, and therefore exhibit properties between those of graphite and diamond.

In general, the microstructure and permeation properties of the carbon membrane resulting from pyrolysis are significantly affected by the pyrolysis conditions (temperature, atmosphere, heating rate, and exposure time) and the nature (i.e., chemical structure and morphology) of the polymer precursor. As a result, various carbon molecular sieve membranes have been successfully developed for the separation of several important gas and solvent mixtures such as $H_2$/propane, $CO_2/N_2$, $CO_2$/methane, propane/propylene, and water/methanol.

CMS membranes enable the separation of gas mixtures consisting of components with different kinetic molecular diameters, since larger molecules are excluded by the membrane while the smaller molecules pass through it.

CMS membranes are available either as self-supporting membranes in the form of thin films, as hollow fibers or as supported membranes on a suitable carrier material.

Known support materials are, for example, porous inorganic oxides such as aluminum oxide or metals such as iron or steel.

H. Richter et al, Angew. Chem. Int. Ed. 2017, 56, 7760-7763 discloses a CMS membrane obtained by pyrolysis of unsaturated linear polyester supported on a carrier of $\alpha$-$Al_2O_3$. A thin layer of $\gamma$-$Al_2O_3$ is provided as an intermediate layer between the support and the CMS membrane.

Other CMS membranes prepared from unsaturated linear polyesters as precursors are known from US 2012/0079943. They are present on a porous substrate, in particular on $\alpha$-$Al_2O_3$ with an overlying layer of $\gamma$-$Al_2O_3$, on which the CMS membrane is then deposited by immersion in a polyimide solution, drying and pyrolysis.

H-H. Tseng et al, Journal of Membrane Science 510 (2016) 391-404 describes membranes obtained from polyetherimide (PEI), polyimide (PI) or poly(furfuryl alcohol) (PFA), each on a support of $\alpha$-$Al_2O_3$ with an intermediate layer of $TiO_2$.

Self-supporting CMS membranes made from polyimide precursors are described in WO 2017/165098. According to this document, conventional or fluorinated polyimides can be used for the preparation of CMS membranes. Such polyimides typically contain at least two different units selected from 2,4,6-trimethyl-1,3-phenylenediamine (DAM), oxydianalin (ODA), dimethyl-3,7-diaminodiphenyl-thiophene-5,5'-dioxide (DDBT), 3,5-diaminobenzoic acid (DABA), 2,3,5,6-tetramethyl-1,4-phenylenediamine (Duren), meta-phenylenediamines (m-PDA), 2,4-diaminotoluene (2,4-DAT), tetramethylmethylenedianaline (TMMDA), 4,4'-diamino 2,2'-biphenyl-disulfonic acid (BDSA), 5,5'-[2,2,2-trifluoro-1-(trifluoromethyl)ethylidene]-1,3-isobenzofuranedione (6FDA), 3,3',4,4'-biphenyltetracarboxylic acid dianhydride (BPDA), pyromellitic acid dianhydride (PMDA), 1,4,5,8-naphthalenetetracarboxylic acid dianhydride (NTDA), and benzophenonetetracarboxylic acid dianhydride (BTDA), with two or more of 6FDA, BPDA and DAM being preferred. Particularly suitable for the preparation of CMS are Matrimid® 5218 (manufactured by Huntsman Advanced Materials), which is a copolymer of 3,3',4,4'-benzophenonetetra-carboxylic acid dianhydride and 5(6)-amino-1-(4'-aminophenyl)-1,3,3-trimethylindane (also referred to as BTDA-DAPI). It has the following structure:

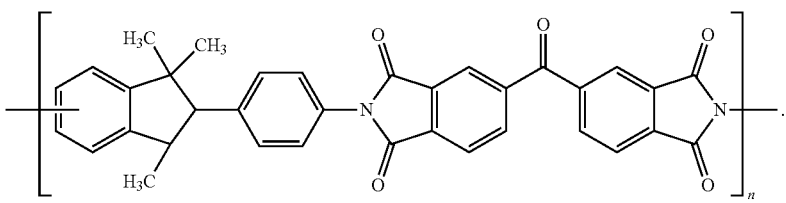

Another suitable polyimide is 6FDA/BPDA-DAM of the following formula:

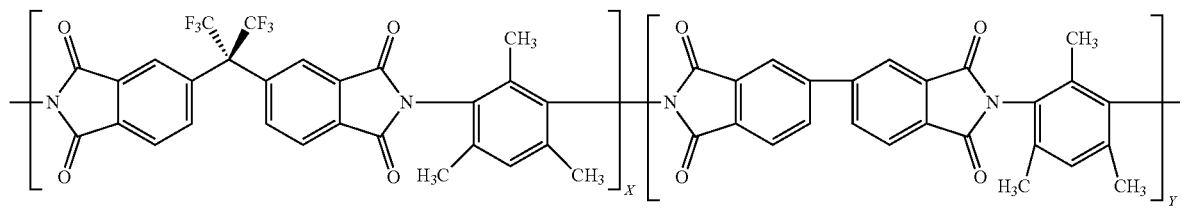

and 6FDA-DAM of the following structure:

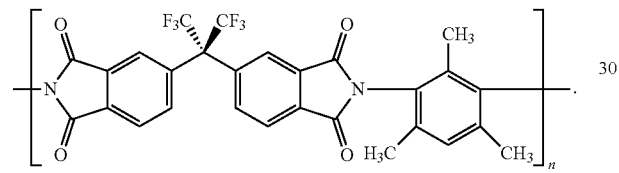

Self-supporting CMS membranes also made from Matrimid® 5218 are disclosed in WO 2016/196595.

CMS membranes in the form of hollow fibers are known from US 2015/0290596. Here, too, Matrimid® 5218, among others, is disclosed as a suitable precursor, in addition to the following polyimides, which can also be used in blends:

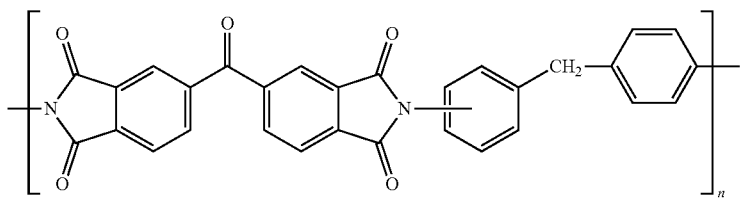

I - BTDA-a/sMDA

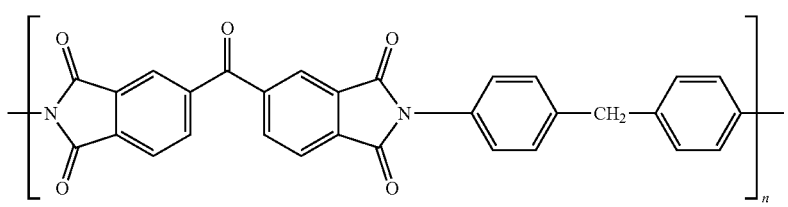

II - BTDA-sDMA

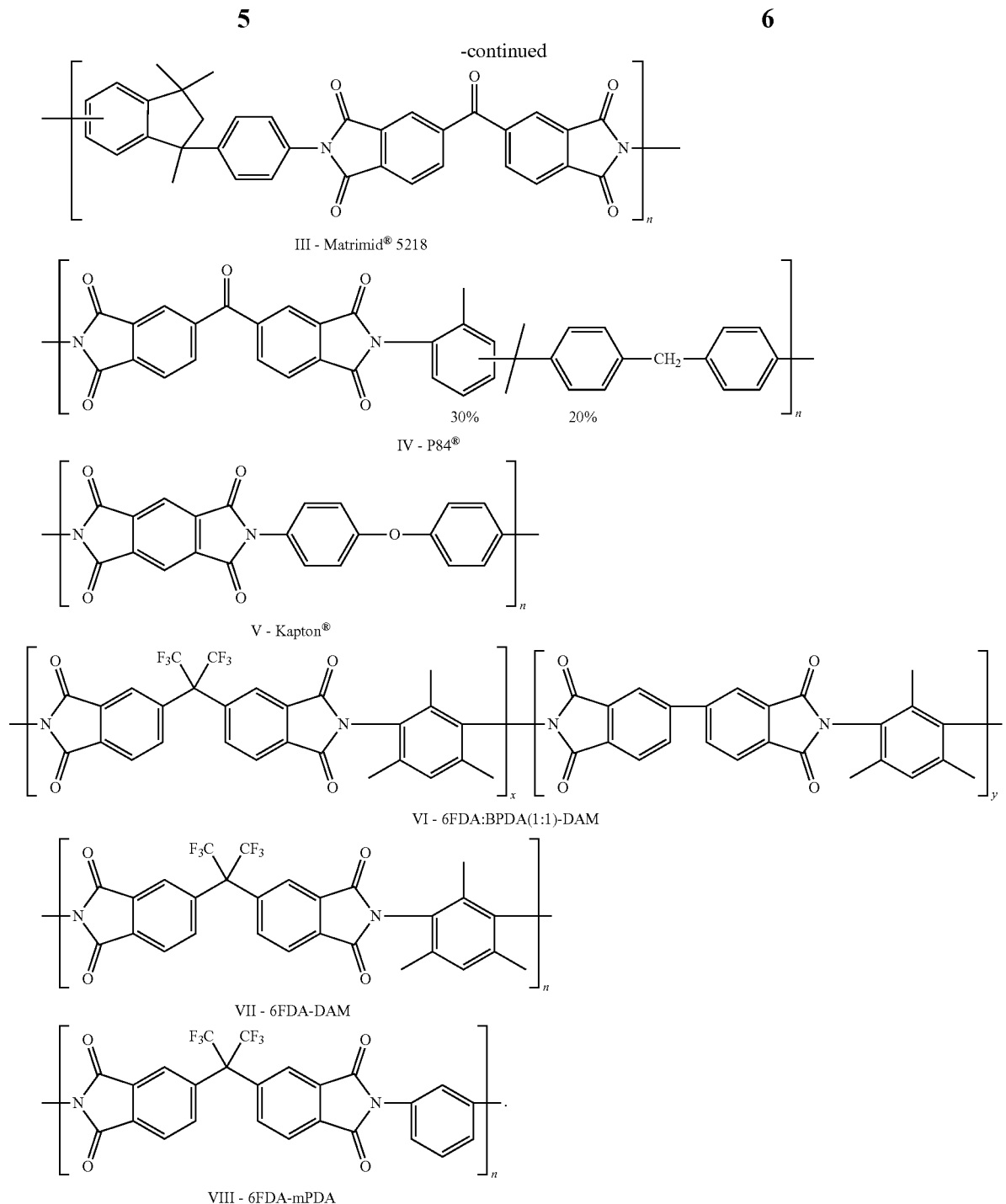

US 2011/0100211 discloses hollow fiber and self-supporting film CMS membranes made from Matrimid® 5218 or 6FDA/BPDA-DAM.

Polyimides are obtained by polycondensation of tetracarboxylic acid dianhydrides with diamines or by reaction of dianhydrides with diisocyanates. In many cases they are non-meltable and chemically very resistant (also to many solvents and acids). Because of their heat resistance, low outgassing, radiation resistance, flame retardancy and insulating properties, they are used in electronics/electrical engineering in the form of semi-transparent films or as thin paint insulations. An important application is also that in X-ray windows in the form of thin films.

In addition to Matrimid® 5218, known commercially available polyimides include Kapton® (DuPont), Vespel® (DuPont), Apical® (Kaneka Americas Holding Inc.), Kinel® (Vyncolit N.V.), Meldin® (Saint Gobain), P84 (Evonik Industries) and Upilex® (Ube Industries).

Another commercially available polyimide from Alfa Aesar™ (article number 43656) with CAS number 62929-02-6 and having the molecular formula $C_{35}H_{28}N_2O_7$ is obtained from the following monomers:

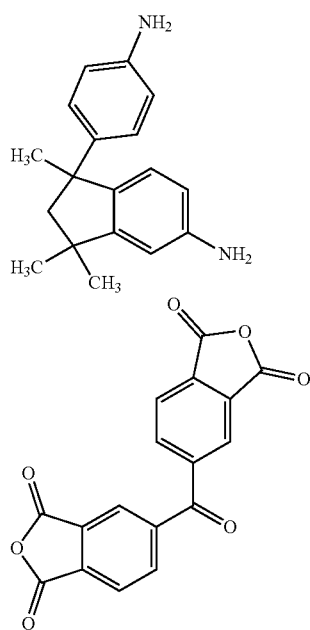

The IUPAC names of the monomers are: 1-(4-Aminophenyl)-1,3,3-trimethyl-2H-indene-5-amine and 5-(1,3-Dioxo-2-benzofurane-5-carbonyl-2-benzofurane-1,3-dione.

It is manufactured by Thermo Fisher (Kandel) GmbH, Karlsruhe, Germany, and is available in powder form or as films of various thicknesses. The flash point is at >93° C. and the melting point at >300° C. The density at 20° C. is 1.2, and the Tg is 305° C., according to the manufacturer. Inherent viscosity is 0.60 to 0.70 dl/g at 25° C. CMS membranes made from this polyimide Alfa Aesar are not yet known.

Polyimides are generally characterized by high glass transition temperatures and a high carbon content.

Supported CMS membranes in the form of hollow tubes are particularly suitable for large-scale applications and have already been used in catalytic membrane reactors, where the supported CMS membrane can be used for selective separation of the products resulting from the catalytic reaction.

Most supported CMS membranes known from the literature show $H_2/CO_2$ selectivities less than or slightly greater than 4.7, in Knudsen diffusion.

TABLE 1

$H_2$ permeance and $H_2/CO_2$ selectivities of CMS membranes known from the literature.

| Polymer precursor | Thickness [μm] | Carrier material | T [° C.] | $H_2$ Permeance [mol/m² s Pa] | Ideal selectivity | Ref. |
|---|---|---|---|---|---|---|
| Phenolic resin | 3.10 | $\alpha$-$Al_2O_3$ | 25 | $1.4 \times 10^{-7}$ | 2.62 | a') |
| Phenolic resin | 35 | Resin | 20 | $1.71 \times 10^{-9}$ | 9.7 | b') |
| Phenolic resin | 30 | Clay/$\alpha$-$Al_2O_3$ | 27 | $2.7 \times 10^{-8}$ | 14.28 | c') |
| Phenolic resin + boehmite | 3 | $\alpha$-$Al_2O_3$ | 120 | $5.029 \times 10^{-8}$ | 22.29 | d') |
| Phenolic resin + PAA* | 2 | Carbon | 25 | $5.45 \times 10^{-8}$ | 6.2 | e') |

TABLE 1-continued $H_2$ permeance and $H_2/CO_2$ selectivities of CMS membranes known from the literature.

| Polymer precursor | Thickness [μm] | Carrier material | T [° C.] | $H_2$ Permeance [mol/m² s Pa] | Ideal selectivity | Ref. |
|---|---|---|---|---|---|---|
| Polyetherimide | 4.8 | $\alpha$-$Al_2O_3$ | 25 | $9.07 \times 10^{-8}$ | 3.10 | f') |
| Polyetherimide | 4 | $TiO_2$/$\alpha$-$Al_2O_3$ | 25 | $5.3 \times 10^{-8}$ | 8.3 | g') |
| Polyimide | 1.6 | $\gamma$-$Al_2O_3$/$\alpha$-$Al_2O_3$ | 25 | approx. $9 \times 10^{-8}$ | 3 | h') |
| Polyetherimide | 2.7 | $\alpha$-$Al_2O_3$ | 25 | approx. $1.4 \times 10^{-7}$ | 2.7 | i') |
| Poly(amic acid) | approx. 100 | Carbon | 30 | $6.84 \times 10^{-9}$ | 9.5 | j') |
| Polyester | 0.125 | $\gamma$-$Al_2O_3$/$\alpha$-$Al_2O_3$ | 150 | Approx. $6.3 \times 10^{-7}$ | approx. 8 | k') |

*PAA: poly(amic acid); 1 Barrer = $10^{-10}$ cm³(STP) cm/cm² s cmHg = $3.35 \times 10^{-16}$ mol m/m² s Pa.

(For the permeance data, the values given in the literature partly in Barrer were converted to [mol/m² s Pa] according to the formula given under Table 1).

References Mentioned in Table 1:
a') Tanco, M. A. L.; Tanaka, D. A. P.; Rodrigues, S. C.; Texeira, M.; Mendes, A., Composite-alumina-carbon molecular sieve membranes prepared from novolac resin and boehmite. Part I: Preparation, characterization and gas permeation studies. International Journal of Hydrogen Energy 2015, 40 (16), 5653-5663
b') Wei, W.; Qin, G. T.; Hu, H. Q.; You, L. B.; Chen, G. H., Preparation of supported carbon molecular sieve membrane from novolac phenol-formaldehyde resin. Journal of Membrane Science 2007, 303 (1-2), 80-85
c') Roy, S.; Das, R.; Gagrai, M. K.; Sarkar, S., Preparation of carbon molecular sieve membrane derived from phenolic resin over macroporous clay-alumina based support for hydrogen separation. Journal of Porous Materials 2016, 23 (6), 1653-1662
d') Rodrigues, S. C.; Whitley, R.; Mendes, A., Preparation and characterization of carbon molecular sieve membranes based on resorcinol-formaldehyde resin. Journal of Membrane Science 2014, 459, 207-216
e') Li, L.; Song, C. W.; Jiang, H. W.; Qiu, J. S.; Wang, T. H., Preparation and gas separation performance of supported carbon membranes with ordered mesoporous carbon interlayer. Journal of Membrane Science 2014, 450, 469-477
f') Wey, M. Y.; Tseng, H. H.; Chiang, C. K., Improving the mechanical strength and gas separation performance of CMS membranes by simply sintering treatment of alpha-$Al_2O_3$ support. Journal of Membrane Science 2014, 453, 603-613
g') Tseng, H. H.; Wang, C. T.; Zhuang, G. L.; Uchytil, P.; Reznickova, J.; Setnickova, K., Enhanced $_{H2/CH4}$ and $_{H2/CO2}$ separation by carbon molecular sieve membrane coated on titania modified alumina support: Effects of $_{TiO2}$ intermediate layer preparation variables on interfacial adhesion (vol 510, pg 391, 2016). Journal of Membrane Science 2018, 554, 274-274
h') Ma, X. L.; Lin, B. K.; Wei, X. T.; Kniep, J.; Lin, Y. S., Gamma-Alumina Supported Carbon Molecular Sieve Membrane for Propylene/Propane Separation. Industrial & Engineering Chemistry Research 2013, 52 (11), 4297-4305 i') Tseng, H. H.; Shih, K. M.; Shiu, P. T.; Wey, M. Y., Influence of support structure on the permeation behavior of polyetherimide-derived carbon molecular sieve composite membrane. Journal of Membrane Science 2012, 405, 250-260 j') Park, H. B.; Kim, Y. K.; Lee, J. M.; Lee, S. Y.; Lee, Y. M., Relationship between chemical structure of aromatic polyimides and gas permeation properties of their carbon molecular sieve membranes. Journal of Membrane Science 2004, 229 (1-2), 117-127 k') Richter, H.; Voss, H.; Kaltenborn, N.; Kamnitz, S.; Wollbrink, A.; Feldhoff, A.; Caro, J.; Roitsch, S.; Voigt, I., High-flux carbon molecular sieve membranes for gas separation. Angewandte Chemie-International Edition 2017, 56 (27), 7760-7763.

The reason for this can be assumed to be the high porosity and roughness of the inorganic support, which lead to the formation of an inhomogeneous polymer layer that can easily form cracks during pyrolysis. Therefore, concentrated polymer solutions or multiple coating-carbonization cycles are usually required to avoid the formation of defects (pinholes) by increasing the membrane thickness. However, this generally compromises $H_2$ permeance. Therefore, in some cases, intermediate layers such as $TiO_2$ or $\gamma$-$Al_2O_3$ have been provided to reduce the surface defects (pinholes) of the support and slightly increase the $H_2/CO_2$ selectivity of the CMS membrane (see above, H. Richter et al., H. H. Tseng et al.).

There is still a need for ultrathin and defect-free (i.e. pinhole-free) membranes with small pore sizes to efficiently separate important gas mixtures (such as H2, $CO_2$, $N_2$, $CH_4$) and liquid mixtures ($H_2O$, methanol, ethanol).

The object of the invention on this background is to provide an ultrathin defect-free CMS membrane suitable for efficient separation of gases with small difference in kinetic diameter as well as similar liquids, especially for separation of $H_2/CO_2$ and dehydration of alcohols such as ethanol and methanol, and a method for its preparation.

This problem is solved by the CMS membrane according to claim 1. The invention further provides a supported CMS membrane according to claim 2. Further embodiments of the invention include the manufacturing process for the supported CMS membrane according to claim 4, and the use of the membranes according to claim 1 or 2 for the separation of gases or liquids, a gas separation or liquid separation apparatus according to claim 8, and the use of the polyimide defined in claim 1 for the manufacture of an MS membrane according to claim 9.

DETAILED DESCRIPTION OF THE INVENTION

Figure 1:
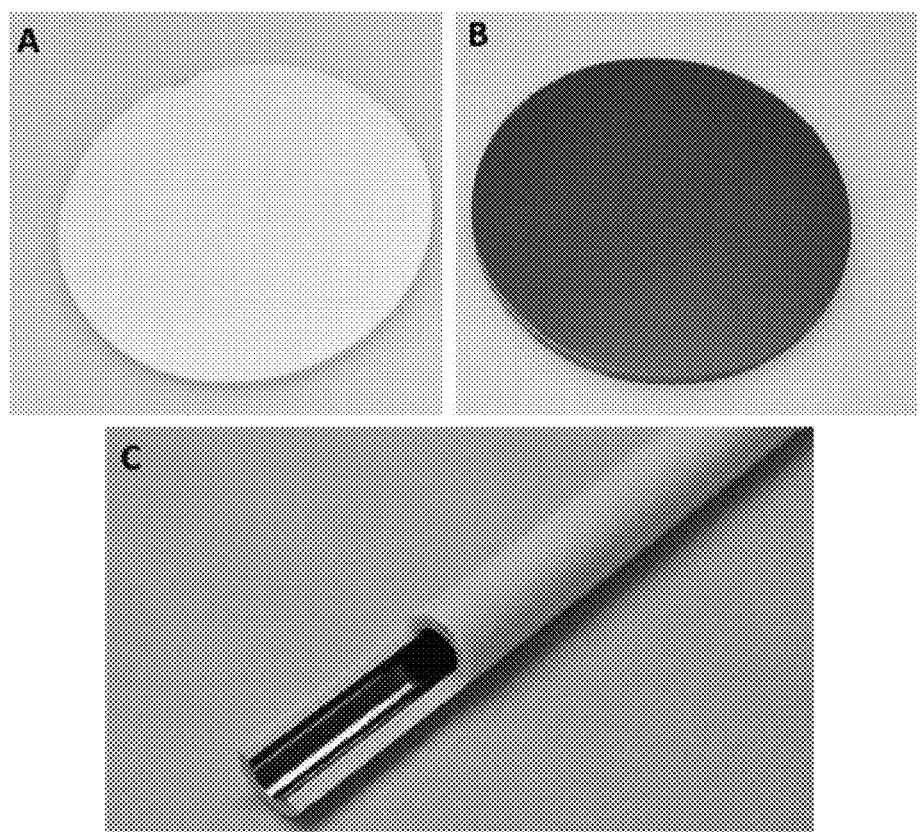
FIG. 1 shows photographic images of an $\alpha$-$Al_2O_3$/$\gamma$-$Al_2O_3$-supported polyimide or CMS membrane according to the invention before (A) and after (B, C) pyrolysis at 700° C.

The terms pyrolysis and carbonization are used synonymously here.

The term "kinetic diameter" is used here to mean the smallest diameter that a molecule can present to its environment. It differs from the atomic diameter, which indicates the atomic size as the size of the electron shell and which is generally much smaller than the kinetic diameter. According to the CRS Handbook of Chemistry and Physics, there are several ways of determining the kinetic diameter, namely from viscosity data, the Van der Waals equation and the thermal conductivity. A calculation from bond angles, bond lengths, and the Van der Waals semimeters is also possible. In most cases, the kinetic diameters calculated by the various methods differ by only 2-3%.

In the context of the present application, the following kinetic diameters for gases reported in the literature (e.g., Scholes, C. A. et al., Recent Patents on Chemical Engineering, 2008, 1, 52-66) are assumed: $CH_4$ 0.38 nm, $N_2$ 0.365 nm, $CO_2$ 0.33 nm, $H_2$ 0.29 nm.

Permeance is the flux rate in cubic meters at standard temperature and pressure conditions of the gas per $m^2$ of membrane area, time and pressure, where the pressure used is the partial pressure difference between the gas supplied and the gas passed. The permeance $Pi$ or $Pj$ and the ideal selectivity $\alpha ij$ are calculated here according to the following formulas (1) and (2):

$$Pi = \frac{Fi}{A \cdot \Delta Pi} \quad (1)$$

$$\alpha ij = \frac{Pi}{Pj} \quad (2)$$

Pi and Pj [mol $m^{-2} s^{-1}$ $Pa^{-1}$] are the permeances of components i and j, respectively, Fi [mol $s^{-1}$] represents the flux rate of component i, A [$m^2$] is the effective membrane area, $\Delta Pi$ [Pa] is the partial pressure of component i between the feed and permeate sides of the membrane, and $\alpha ij$ is the permeance ratio of component i to component j.

The gas permeability is the degree of permeability of a solid for a certain substance, i.e. the degree for its permeation. Permeability is influenced by the type of permeate as well as by pressure, temperature, thickness of the solid and its surface area. It is sometimes given in the literature in the non-SI unit Barrer.

1 Barrer=$3.35 \times 10^{-16}$ mol $m/m^2$ s Pa. In the unit Barrer, cm corresponds to the membrane thickness, and $cm^3$ $cm^{-2}$ $s^{-1}$ corresponds to the gas flux through the membrane, and cmHg corresponds to the pressure drop through the membrane.

Gas permeance is often expressed in GPU (gas permeance unit). Permeance is the ratio of permeability to membrane thickness.

$$1 \ GPU = 10^{-6} cm^3 (STP)/cm^2 \ s \ cm \ Hg =$$
$$7.501 \times 10 - 12 \ m^3(STP)/m^2 \ s \ Pa = 3.33 \times 10^{-10} \ mol/m^2 \ s \ Pa$$

Permselectivity refers to the ratio of permeances.

A review of IUPAC definitions for flux, permeance, permselectivity, and separation factor is given in Caro, J. et al, Zeolite Membranes—Status and Prospective, Advances in Nanoporous Materials Volume 1, 2009, Elsevier B.V., Chapter 1, p. 16, 3.1, which is incorporated by referenced herein in its entirety.

STP means standard temperature and pressure.

Permporosimetry is a technique for determining the pore size of porous materials. With this technique it is possible to determine the pore size in the range of 0.5-50 nm depending on the adsorbent (steam). Here, a binary feed mixture of an inert gas (He or $N_2$) and a vapor (water or hexane) is passed through the membrane. The vapor fills the pores of the membrane and blocks the passage of the less adsorbed gas, i.e., He or $N_2$. A remaining $N_2$ or He flux indicates the presence of defects (larger pores that cannot be completely filled). A Kelvin equation is usually used to calculate the pore radius. (For details of the measurement method, see. Caro, J. et al, Zeolite Membranes—Status and Prospective, Advances in Nanoporous Materials Volume 1, 2009, Elsevier B.V., Chapter 1, pp. 18-22, 3.2).

The Robeson upper bound indicates the performance limit of a polymer membrane that suffers from a trade-off between selectivity and permeability. Polymer membranes with high permeability show lower selectivity and vice versa. In 1997 and 2008, Robeson established this upper limit by comparing the permeability to the selectivity of numerous polymer membranes. (Robeson, L. M., Journal of Membrane Science 320 (2008) 390-400).

Defect (pinhole) means macroscopic defects in the membrane. More concretely, defect means that the pore size of the CMS membrane is larger than the kinetic molecular diameter of the largest molecule that one wants to separate, so that separation based on molecular size can no longer occur. For example, if the pore size of the membrane is larger than the kinetic diameter of $CO_2$ (0.33 nm), no selective separation of $H_2/CO_2$ can occur with the appropriate membrane because both $H_2$ (kinetic diameter 0.29 nm) and $CO_2$ can diffuse through the correspondingly large pores. Defects in membranes can have a size of about 4 nm to 1 μm. A distinction is made between mesodefects (2-50 nm) and macrodefects (>50 nm). Defects result in low selectivity or no selectivity of the membrane. Since the permeance due to defects is much larger than that of a defect-free membrane, the total membrane permeance can be dominated by the defect flux. Defects can occur as a result of problems in the deposition method for the membrane and defects in the surface on which the membrane is deposited. In the case of membrane deposition by sol-gel methods, defects can also result from bubble formation during the preparation of the sol. (For details on measurement, see S. Chiu, W. V. et al, Journal of Membrane Science 377 (2011) 182,190).

Ultra-thin means a layer thickness of the CMS membrane of less than 1 μm.

Thin means a layer thickness of the CMS membrane of approx. 1 to 2 μm. The layer thickness can be determined by scanning electron microscope of a section.

Figure 6:
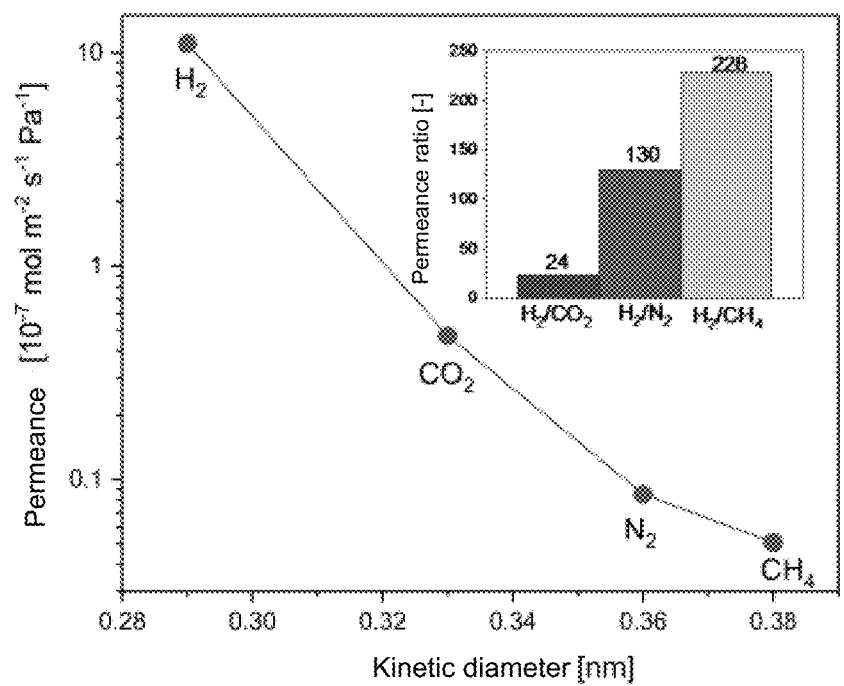
FIG. 6 shows single gas permeation through an $\alpha$-$Al_2O_3$/$\gamma$-$Al_2O_3$-supported CMS membrane according to the invention with a feed pressure of 2 bar at 200° C. The inset shows the ideal separation factors.
Figure 7:
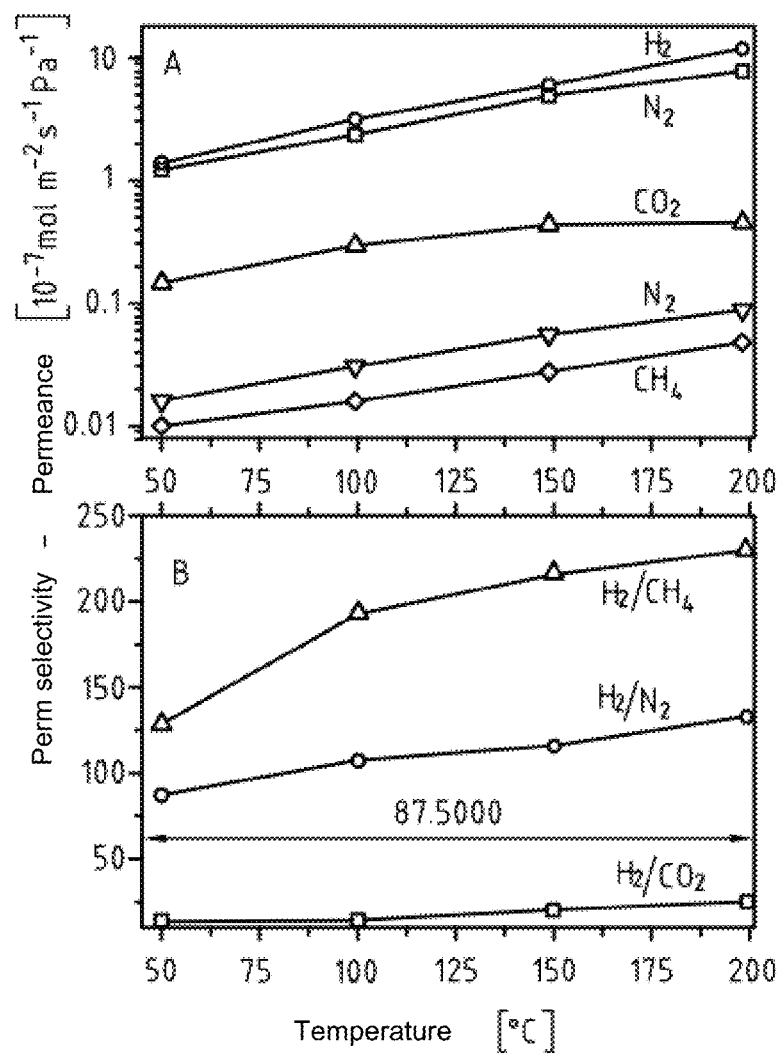
FIG. 7 presents the temperature dependence of the single gas permeance (A) and perm selectivity (B) for an $\alpha$-$Al_2O_3$/$\gamma$-$Al_2O_3$-supported CMS membrane according to the invention at 2 bar feed pressure.

According to the invention, the pore size in the CMS membrane can be determined by single gas permeation measurements of several gases with different kinetic diameters (FIGS. 6 and 7). It is defined by which gases are still allowed to pass, i.e., by the gas permeability. Pore size is understood to be the mean pore diameter.

Figure 10:
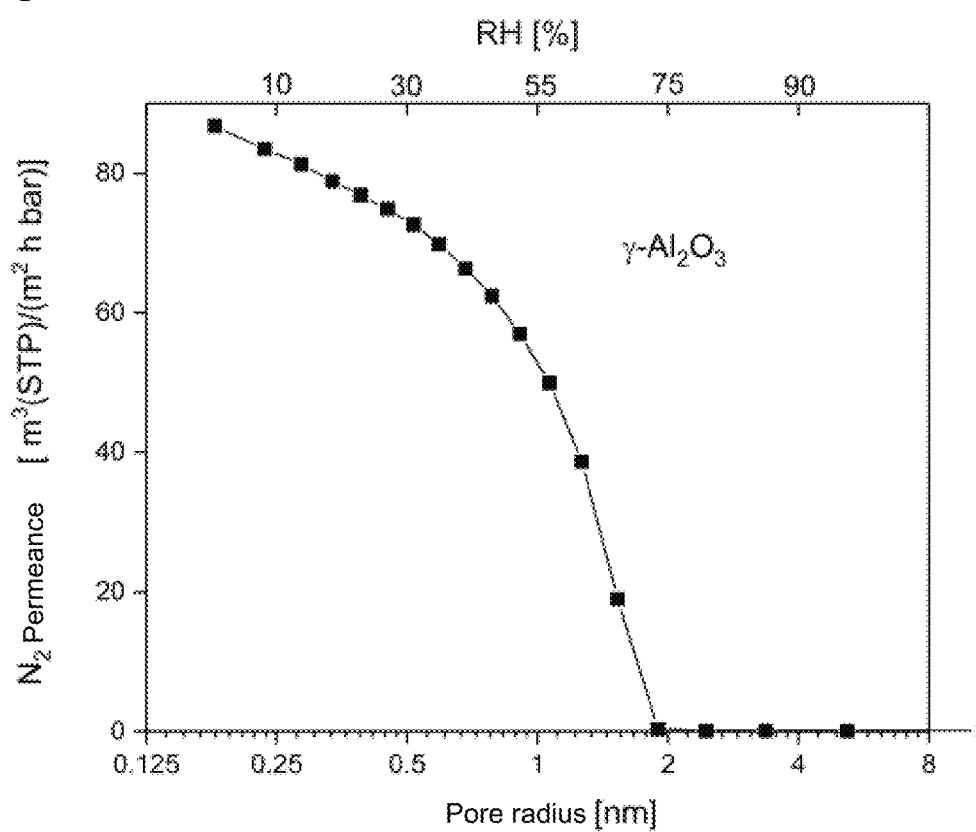
FIG. 10 shows $N_2$ permporosimetry measurements with an $N_2$/$H_2O$ mixture at 20° C. on a tubular $\alpha$-$Al_2O_3$ support coated with a $\gamma$-$Al_2O_3$ layer according to the invention.

The pore size of the intermediate layer (e.g. $\gamma\text{-Al}_2\text{O}_3$) is determined by permporosimetry (FIG. 10).

The pore size of the support (e.g. $\alpha\text{-Al}_2\text{O}_3$) is determined by the manufacturer in each case by scanning electron microscopy.

Figure 19:
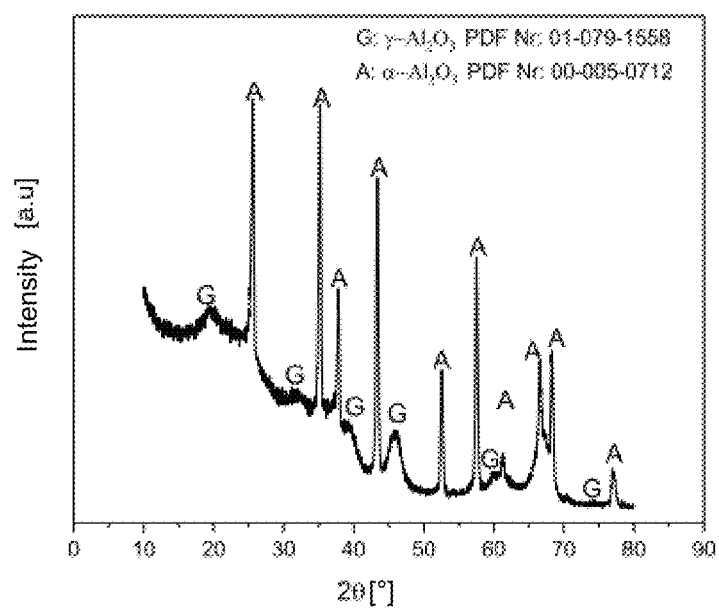
FIG. 19 shows the X-ray diffraction analysis of an $\alpha$-$Al_2O_3$/$\gamma$-$Al_2O_3$-supported CMS membrane according to the invention after heat treatment at 700° C. (CMS-700). The diffraction peaks of $\alpha$-$Al_2O_3$ (A) and $\gamma$-$Al_2O_3$ (G) are clearly visible.
Figure 20:
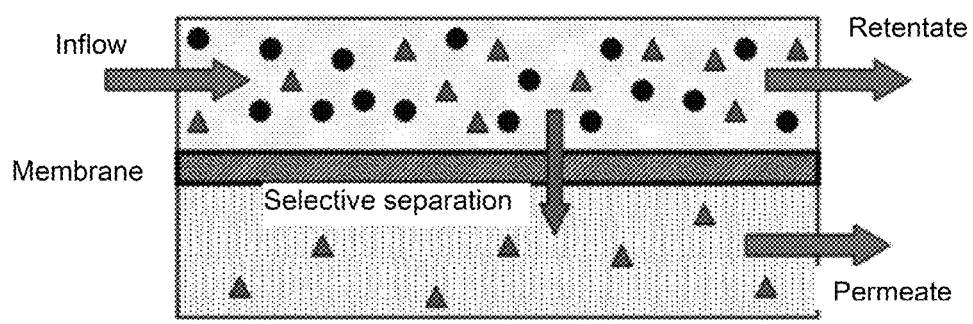
FIG. 20 is a schematic diagram of membrane separation (Scholes, C. A. et al., Recent Patents on Chemical Engineering 2008, 52-66, p. 53).
Figure 21:
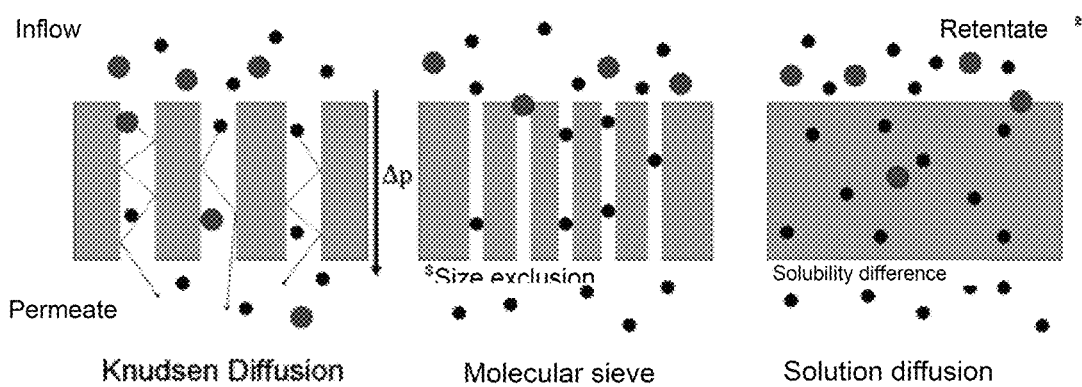
FIG. 21 is a schematic representation of the three basic separation mechanisms on membranes (Scholes C. A. et al., op. cit., p. 54).

The crystalline structures of the $\alpha\text{-Al}_2\text{O}_3$ supports used in the invention are based on manufacturers data, and the presence of $\alpha\text{-Al}_2\text{O}_3$ was additionally confirmed by X-ray diffraction (FIG. 19).

Figure 3:
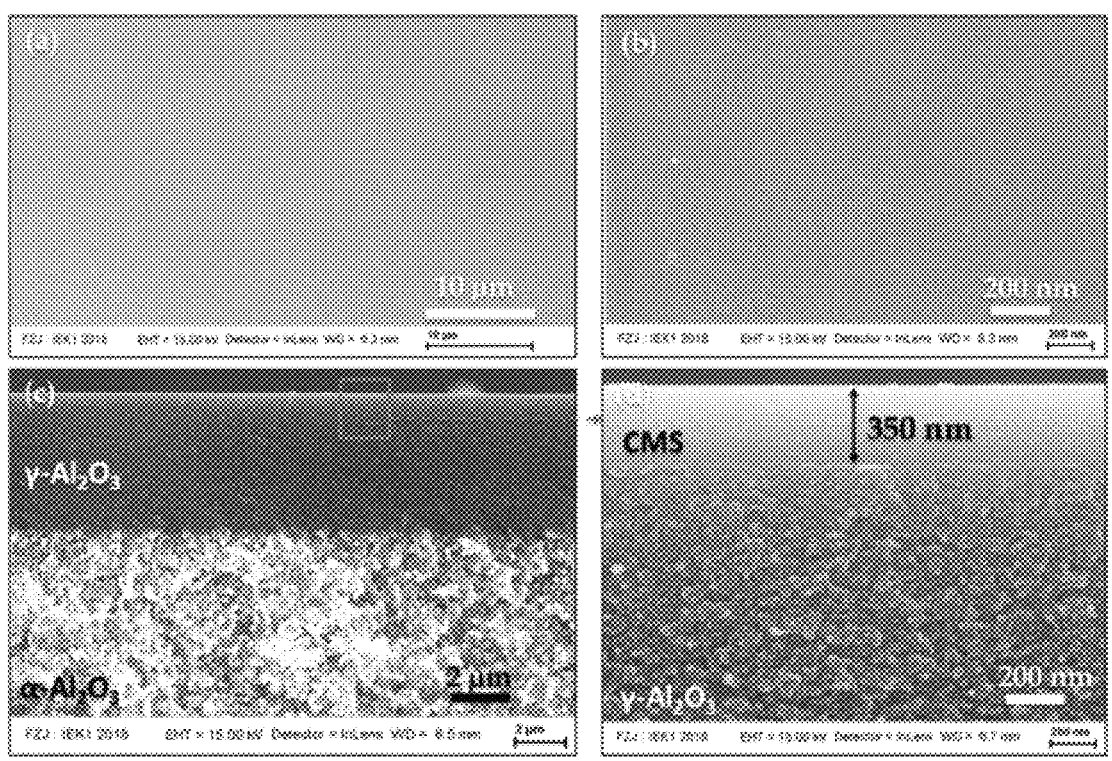
FIG. 3 shows SEM images of the surface (a, b) and section (c, d) of an $\alpha$-$Al_2O_3$/$\gamma$-$Al_2O_3$ supported planar CMS membrane according to the invention.

The presence of $\gamma\text{-Al}_2\text{O}_3$ on the top surface of the $\alpha\text{-Al}_2\text{O}_3$ support of the interlayer of the invention was also confirmed by X-ray diffraction (FIG. 19) and scanning electron microscopy (FIG. 3). Furthermore, it is known that $\alpha\text{-Al}_2\text{O}_3$ has a much larger pore diameter than $\gamma\text{-Al}_2\text{O}_3$. The average pore diameter of $\gamma\text{-Al}_2\text{O}_3$ is. i.a. about 3 to 5 nm (Chen, X. et al., Microporous and Mesoporous Materials 214 (2015) 195-203). Therefore, from the permporosimetry of the membranes according to the invention for $N_2/H_2O$ mixture, which showed a mean pore diameter of about 4 nm (FIG. 10), the presence of $\gamma\text{-Al}_2\text{O}_3$ is evident due to the small pore size according to the invention.

The CMS membrane according to the invention is in the form of a film or in the form of hollow fibers, preferably in the form of a film.

The supported CMS membrane according to the invention is provided on a porous support and a mesoporous intermediate layer provided thereon.

According to the invention, porous support means that the support has an average pore diameter of 60 to 90 nm, preferably 65-85 nm, particularly preferably 70 or 80 nm, determined by scanning electron microscopy.

Mesoporous interlayer generally means that pore sizes are in the range of 2 to 50 nm. According to the invention, however, mesoporous means that the interlayer has an average pore diameter of 3 to 6 nm, preferably 3 to 5 nm, particularly preferably 3.5 to 4.5 nm, measured by permporosimetry measurement on the finished supported CMS membrane.

The CMS membrane according to the invention, i.e. in the case of the supported CMS membrane without a support and without an intermediate layer, preferably has a layer thickness of 300 to 400 nm, preferably about 350 nm, measured by scanning electron microscopy of a section.

According to the invention, the material of the porous support is preferably selected from $\alpha\text{-Al}_2\text{O}_3$, $TiO_2$, $ZrO_2$ and a suitable metal, and is particularly preferred $\alpha\text{-Al}_2\text{O}_3$.

The material of the mesoporous interlayer is preferably selected from $\gamma\text{-Al}_2\text{O}_3$ or $TiO_2$, particularly preferably it is $\gamma\text{-Al}_2\text{O}_3$.

The CMS membrane is obtained by pyrolysis of a polyimide precursor. Preferred polyimides according to the invention are the above-mentioned known polyimides defined in claim 3. Particularly preferred is the above-mentioned polyimide of the company Alfa Aesar of CAS No. 62929-02-6. It can be prepared from the monomers indicated in claim 1 by conventional methods known to those skilled in the art, e.g. by acid-catalyzed condensation. It is particularly suitable for the preparation of CMS membranes due to its high glass transition temperature (Tg) of >305° C. as well as its high carbon content. By using this polyimide, particularly high-quality, i.e. defect-free CMS membranes with a graphitic microstructure can be obtained.

The supported CMS membrane according to the invention is, for example, in the form of a hollow tube or in the form of a flat disc.

In the case of a tube, the intermediate layer and the CMS membrane are located inside the tube. The support tubes preferably have an asymmetric configuration that exhibits a pore gradient, with the pore size decreasing from the outside to the inside. The pore size specified by the manufacturer is the cut-off specification, i.e., it is the smallest pore size of the respective asymmetric support. The support tubes have common dimensions for commercial ultrafiltration membranes, e.g. 10 mm outer diameter/6 mm inner diameter to 26 mm outer diameter/16 mm inner diameter. The length is up to 1500 mm, preferably 200 to 400 mm, particularly preferably 300 mm.

In the case of a disk, for example, the support has a diameter of about 35 to 50 mm, preferably 39 mm, and a thickness of 1 to 3 mm, preferably 2 mm. Commercially available porous filtration membranes can be used as supports.

According to the invention, the intermediate layer is produced by applying a sol of a suitable precursor and subsequent calcination.

The intermediate layer is preferably applied by applying a boehmite sol and subsequent calcination. Common sols can be used as boehmite sols. Particularly preferred is a boehmite sol prepared by the method described by Chen, X. et al, Microporous and Mesoporous Materials 214 (2105) 195-203. The concentration of the boehmite sol is typically about 0.5 to 2 wt %, preferably 1-1.3 wt %, the pH is generally 2 to 4, preferably about 3-3.5, the viscosity is typically 1 to 1.5 mPa s, preferably about 1.1 to 1.3 mPa s, and the particle size in the sol is about typically 18-30 nm, preferably 20-26 nm. By using a sol with these properties, a particularly smooth mesoporous intermediate layer with suitable pore size can be obtained according to the invention.

The sol can be applied by any known method, e.g. dip coating, spray coating, doctoring or others. Preferably, it is applied by dip coating.

Calcination is carried out in air at temperatures of approx. 500 to 700° C., preferably approx. 600° C. Heating can be carried out, for example, at a heating rate of 1° C. per minute until the desired final temperature is reached. This temperature is then maintained for 2 to 4 hours, preferably for 3 hours, and then cooled to room temperature at the same rate. Preferably, the application and calcination are repeated once to avoid large pores in the intermediate layer.

The layer thickness of the intermediate layer thus produced is preferably about 4 to 6 µm, particularly preferably about 5 µm, as determined by scanning electron microscopy (see FIG. 3 c).

The support thus obtained with the mesoporous intermediate layer is also referred to as the composite support.

The dip-coating of the support provided with the intermediate layer to produce the polyimide layer as precursor of the CMS membrane is preferably performed as defined in claim 6.

Suitable solvents for the polyimide include tetrahydrofuran, N,N-dimethylformamide or N-methyl-2-pyrrolidone. N-methyl-2-pyrrolidone (NMP) is particularly suitable.

Figure 16:
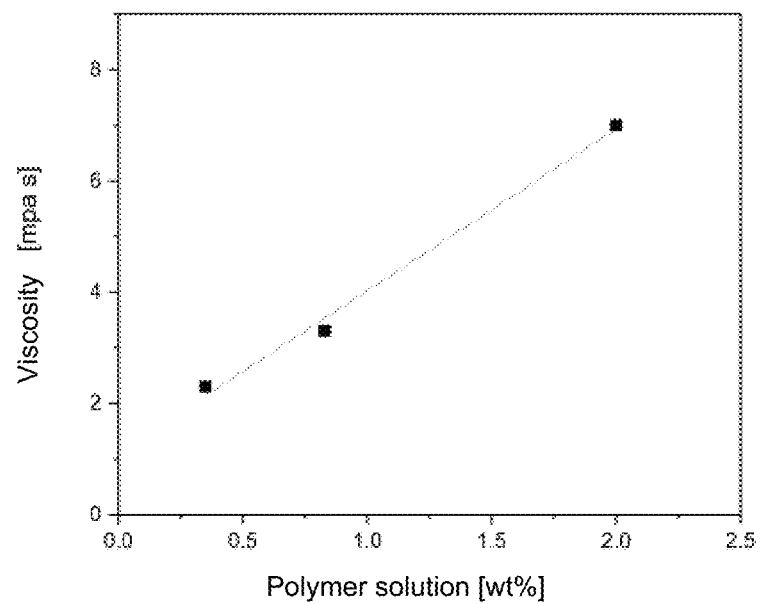
FIG. 16 is a graph showing the linear relationship between solution concentration and viscosity of a solution of Alfa-Aesar polyimide in NMP.
Figure 17:
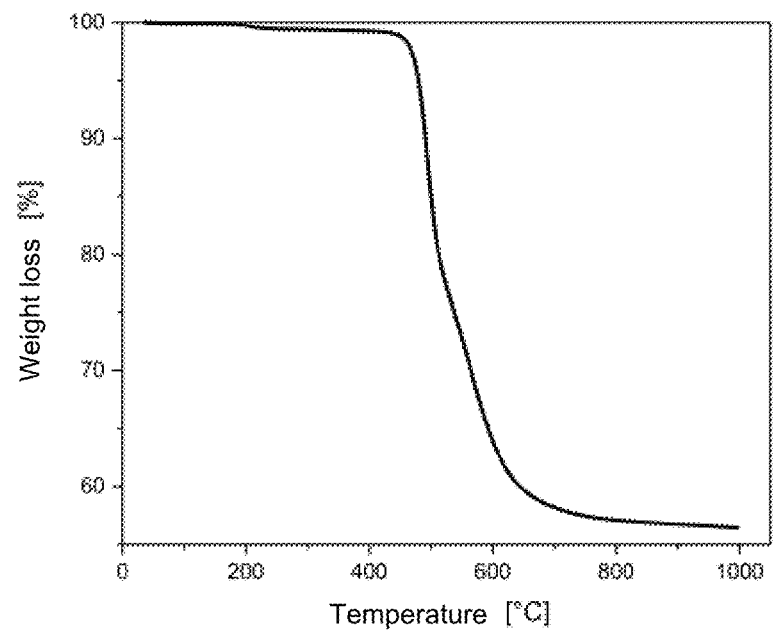
FIG. 17 is a graph of the thermogravimetric analysis of Alfa Aesar polyimide. Thermal decomposition starts at about 450° C.
Figure 18:
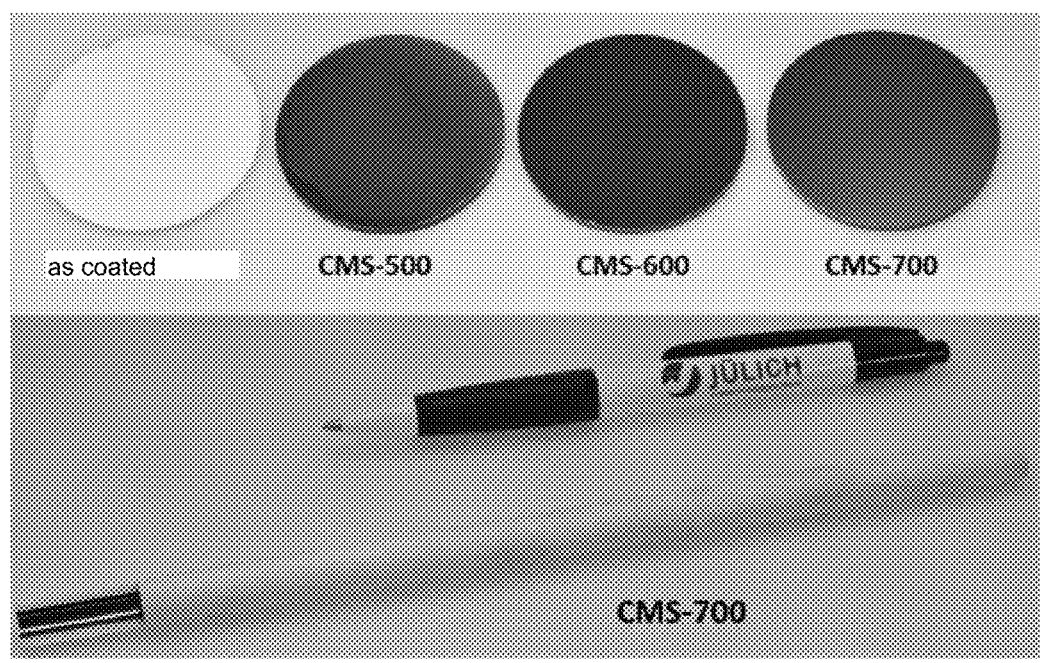
FIG. 18 shows photographs of an $\alpha$-$Al_2O_3$/$\gamma$-$Al_2O_3$-supported polyimide or CMS membrane according to the invention at different stages of pyrolysis (as coated, 500° C., 600° C. and 700° C.) and a size comparison of a tubular $\alpha$-$Al_2O_3$/$\gamma$-$Al_2O_3$-supported CMS membrane according to the invention after pyrolysis at 700° C. using a commercial ballpoint pen.

Due to the concentration of the polyimide of about 1 to 3 wt %, preferably 2 wt %, the solvent N-methyl-2-pyrrolidone (NMP) as well as the resulting viscosity of the polyimide solution of about 2 to 7 mPa s (see FIG. 16) and the special immersion conditions (immersion speed 5 to 15 m/sec, preferably 10 mm/s and immersion time 10 to 30 sec, preferably 10 s), it is surprisingly possible to reproducibly produce very thin hydrogen-selective CMS membranes.

In the dip coating in step iii), preferably a solution of the polyimide with a concentration of 1 to 3 wt. %, preferably 2 wt. %, in N-methyl-2-pyrrolidone is used. The film obtained is then dried, e.g. at 90° C. overnight.

Preferably, dip coating and drying are performed in a clean room of class ISO 5 (according to ISO 14644-1) to avoid contamination of the polyimide film with dust.

According to the invention, the pyrolysis of the polyimide film is preferably carried out as indicated in claim 5.

Heating is preferably carried out in stages at a heating rate of initially 0.5 to 2° C./min, preferably 1° C./min to 300 to 400° C., preferably 350° C., then held at this temperature for 0.5 to 1.5 h hours, preferably 1 h, and then heated at the same heating rate to a temperature of 550° C. to 750° C., preferably 600° C. or 700° C., and allowed to stand at the temperature reached for 1 to 3 hours, preferably 2 h. Subsequently, cooling to room temperature is preferably performed at a rate of 0.5 to 1.5° C./min, preferably 1° C./min. All heating, holding and cooling steps are carried out in vacuum as indicated in claim 5.

All temperature data during calcination of the boehmite sol and pyrolysis of the polyimide refer to the temperature of the furnace. The temperature of the sample may deviate from this.

Typically, in the prior art much higher temperatures are used for polyimide pyrolysis, such as 800° C. or 900° C. (WO 2016/196595) or even 1000° C. (US 2011/0100211).

WO 2016/196595 describes a very complex heating protocol with constantly changing heating rates ranging from 0.25° C./min to 13.3° C./min, similar to other documents.

In the prior art, pyrolysis is also frequently carried out under inert gas such as nitrogen, helium or argon.

According to the invention, it is surprisingly possible to obtain very reproducible CMS membranes with high $H_2$ selectivity by a simple pyrolysis protocol in vacuum at lower temperatures.

A particularly preferred embodiment of the supported CMS membrane according to the invention is one having a porous support of $\alpha$-$Al_2O_3$, a mesoporous intermediate layer of $\gamma$-$Al_2O_3$ provided thereon, and a CMS membrane obtained by pyrolysis of the polyimide of CAS No. 62929-02-6.

Another embodiment of the invention is a per se conventional apparatus for membrane separation of gases or liquids, comprising the supported CMS membrane according to the invention and/or the unsupported CMS membrane according to the invention.

It is also claimed that the membranes of the invention can be used for the separation of gas mixtures. Mixtures of $H_2/CO_2$ or of $H_2/CH_4$ are preferred, since particularly good separation results are achieved with them. In the gas mixtures, the two gases to be separated are present, for example, in the molar ratio 0.5/0.5, preferably 0.65/0.35, particularly preferably 0.70/0.20.

Further, the supported and unsupported CMS membranes according to the invention can be used advantageously for the separation of liquids. Preferably, water/alcohol mixtures are separated, especially preferably water/methanol or water/ethanol mixtures. Particularly suitable for such separations are water/alcohol starting mixtures with a water content of 5 to 15 wt. %, preferably about 10 wt. %.

The CMS membrane according to the invention exhibits the highest $H_2$ permeance and $H_2/CO2$ permselectivity of all supported CMS membranes known in the literature (see Table 1 above). This is clearly due to several parameters such as the membrane configuration, the choice of polymeric precursor and the pyrolysis conditions. Indeed, the presence of the mesoporous $\gamma$-$Al_2O_3$ layer allows the synthesis and deposition of a high-quality polyimide thin film and the subsequent formation of a thin and hole-free carbon selective layer.

Thin and defect-free CMS membranes were reproducibly prepared according to the invention by carbonizing a commercial polyimide resin Alfa Aesar polyimide resin, at 700° C. on a composite $\alpha$-$Al_2O_3$/$\gamma$-$Al_2O_3$ support. XPS and Raman characterizations showed that the pyrolyzed carbon membrane is a mixture of amorphous and "turbostratic" carbon.

By turbostratic is meant non-graphitic carbon consisting of layers of hexagonally arranged, $sp^2$-hybridized carbon atoms. These layers are stacked approximately parallel without any three-dimensional long-range ordering. This material consists of stacks of graphene layers twisted and shifted against each other. This arrangement is called turbostratic. Here, the spacing of the layers from one another can deviate significantly from the spacing found in graphite.

Single gas permeation measurements showed that the membrane reproducibly provided $H^2$ permeance in the range of $1 \times 10^{-6}$ mol $m^{-2}$ $s^{-1}$ $Pa^{-1}$ with permselectivities of $H_2$ versus $CO_2$, $N_2$, and $CH_4$ of about 24, 130, and 228, respectively, at 200° C. These values are the highest separation performances reported for carbon membranes to date. These excellent results were attributed to the excellent molecular sieve character of these membranes, which exhibit a stronger temperature dependence for the permeation of small gas ($H_2$) than large gases ($CO_2$, $N_2$ and $CH_4$).

The carbon membranes of the invention also exhibit unprecedented separation performance in the dehydration of aqueous alcohol mixtures, even for the more challenging water-methanol mixture.

Based on these results, it can be expected that the membranes according to the invention have great potential in high-temperature hydrogen purification and dewatering of aqueous alcohol mixtures.

EXAMPLES

Precursors and Raw Materials

Commercially available polyimide powder (polyimide resin, article number 43656) purchased from Alfa Aesar (CAS number: 62929-02-6) was used as a polymer precursor. N-methyl-2-pyrrolidone (NMP), which was purchased from Sigma Aldrich, was used as the solvent. Tubular $\alpha$-$Al_2O_3$ ultrafiltration membranes (length: 300 mm, outer diameter: 10 mm, pore size approximately 70 nm) sealed at the edges with a glass coating were purchased from atech innovations GmbH, Germany. $\alpha$-$Al_2O_3$ disks with a diameter of 39 mm, a thickness of 2 mm and a pore size of approx. 80 nm were supplied by COBRA Technologies BV Netherlands.

Supported disc-shaped membranes were used for characterization tests, while tubular supported membranes were used for gas permeation and pervaporation tests.

Production of Boehmite Sol 35 g of aluminum tri-sec-butoxide (Sigma Aldrich CAS: 2269-22-9) was mixed with 250 ml dist. water at 100° C. 0.8 ml of $HNO_3$ 70% (Sigma Aldrich CAS Number 7697-37-2) was added and stirred at 100° C. overnight. The solution obtained is the boehmite sol.

Membrane Production

The polymer solution was prepared by mixing 2 wt % polyimide powder Alfa Aesar polyimide in NMP (N-methyl-2-pyrrolidone) and stirring for 10 hours.

The $\alpha$-$Al_2O_3$ disks (COBRA Technologies BV) and $\alpha$-$Al_2O_3$ tubes (atech innovations GmbH) described above (in the case of tubes, only the inner surface in each case) were dip-coated with the boehmite sol described above and calcined at 600° C. in air. This was done by heating at a rate of 1° C./min until 600° C. was reached, then holding at this temperature for three hours, and then cooling to room temperature at a rate of 1° C./min. During the dip coating process, the boehmite sol was applied at a dip and removal rate of 10 mm/s each, with a dip time of 20 s. The dip coating and drying process were carried out in an ISO 5 class clean room (ISO 14644-1) to avoid dust contamination. The coating calcination process was repeated once to remove large pores that can lead to pinholes (defects) in the membrane.

After calcination, $\gamma$-$Al_2O_3$ with an average pore diameter of about 4 nm (FIG. 10) was obtained. In FIG. 10, it can be clearly seen that the pores of the $\gamma$-$Al_2O_3$ layer are completely filled with water for a relative humidity of about 75%. This corresponds to a mean pore size of about 4 nm according to the Kelvin equation.

The $\gamma$-$Al_2O_3$/$\alpha$-$Al_2O_3$ composite supports prepared in this way were then dip coated with the polymer solution prepared as described above as follows and dried overnight at 90° C. During the dip coating process, a polymer layer was deposited at a dip and removal speed of 10 mm/s each with a dip time of 20 s. The dip coating and drying process were carried out in an ISO 14644-1 class 5 clean room to avoid dust contamination.

The resulting supported polymer membranes were then placed in the center of a furnace (Gero HTK 25 Mo/16-1G) to undergo heat treatment. A vacuum of about $10^{-6}$ mbar was applied before starting the carbonization process. The samples were heated to 350° C. at this pressure with a heating rate of 1° C./min and 1 h dwell time. The temperature was then increased to 700° C. at the same heating rate and the samples were allowed to stand for an additional 2 hours. The membranes were then cooled to room temperature at a cooling rate of 1° C./min, also in vacuo.

The thickness of the obtained CMS membrane was about 350 nm (FIG. 3), determined by scanning electron micrograph of a section.

Membrane Characterization

Various techniques such as Fourier transform infrared spectroscopy (FTIR), X-ray photoelectron spectroscopy (XPS), water contact angle measurement, and scanning electron microscopy were used.

The chemical structure of both membranes was determined using the Tensor 27 infrared spectrometer (Bruker Optics) equipped with a DTGS detector and a Golden Gate diamond attenuated total reflectance (ATR) unit with ZnSe mirrors. The resolution of the spectrometer was set to 4 $cm^{-1}$. All spectra were measured in the range 600-4000 $cm^{-1}$ and normalized to the gradient vector for comparison.

XPS measurements were performed using a PHI5000 Versa Probe II from ULVAC-PHI Inc. in the USA. Nuclear level spectra (C1s, O1s, C1s, and N1s) of the supported membranes were recorded using an Al k-alpha (1,486 KeV) source for excitation in the analysis chamber under high vacuum ($1\times10^{-8}$ mbar) and at a forward energy of 23.5 eV with a resolution of 0.1 eV. Atomic ratios and surface concentrations were determined quantitatively from the range of C1s, N1s, and O1s peaks after a Smart-type background subtraction, while peak deconvolution was achieved with a mixed Gaussian and Lorentzian function. The binding energy was normalized by setting the C1s core level to 285 eV ($sp^3$) and 284.5 eV ($sp^2$).

Water contact angle measurements were performed at room temperature using the Sessile drop method with a contact angle goniometer equipped with a video camera recording system and drop shape analysis software. The water droplet with a volume of 3 µl was placed at four different locations on the dip-coated membrane surface. For each, the contact angle was measured and the mean value was determined.

The surface morphology and thickness of the supported membranes were examined using a scanning electron microscope (SEM Ultra 55, Carl Zeiss Microscopy GmbH, Jena, Germany). Cross-sectional images were obtained by breaking the sample with cutting forceps. The samples, i.e. the membrane surface, were coated with a conductive layer consisting of platinum with a thickness of 3-5 nm before analysis.

The particle size distribution of polymers in solutions was determined by dynamic light scattering (DLS) at 25° C. using a HORIBA LB-550 system. The polymer solution was prepared by mixing 2 wt % polyimide powder Alfa Aesar polyimide in NMP (N-methyl-2-pyrrolidone) and stirring for 10 hours, and filtered through a 0.2 µm filter before each measurement to remove dust particles that could interfere with the measurement.

Shear viscosity was measured using a "Physica MCR 301-Rheometer" rotational rheometer.

The thermal decomposition of the polyimide was recorded by thermogravimetric analysis (TGA) using an STA-449 F1 Jupiter instrument with a heating rate of 10° C./min under argon.

X-ray diffraction was performed as follows: A D4 Endeavor Bruker AXS diffractometer with a Kristalloflex 770 X-ray radiation generator was used for measurement. A Pawley fit using "Topas 4.2" software was used for crystalline phase identification with the JCPDS-ICD powder X-ray data bak. PDF cards No. 01-079-1558 for $\gamma$-$Al_2O_3$ and No. 00-005-0172 for $\alpha$-$Al_2O_3$ were used for comparison.

Raman spectra were recorded using a Renishaw inVia Raman spectroscope with a Pelletier-cooled CCD. The excitation wavelength was 514 nm (Ar ion laser) focused through a 50×0.75 Leica N PLAN EPI objective with a laser energy of 0.075 mV and 20% laser defocus. Spectra were recorded at a resolution of 1.0 $cm^{-1}$ and accumulated by 20 scans of 20 s each.

Gas Permeance

Here, the gas permeance was measured from 200° C. to 50° C. for three test samples for each membrane. The measurement was made in an in-house developed dead-end permeation tester with a tubular stainless steel membrane module. The permeate flow was maintained at atmospheric pressure, and the pressure through the membrane was maintained at 2 bar. Gas inflow on the feed side of the module was controlled by an accurate pressure controller (Bronkhorst differential pressure controller with F-001 valve). The gas inflow rate on the permeate side was measured using two flowmeters with a maximum flow of 7.74 ml $min^{-1}$ and 209 ml $min^{-1}$ (Brooks GF40). Before determining the permeation properties, the membranes were each dried overnight at 200° C. in vacuum.

Pervaporation Test

A commercial cross-flow test unit (Pervatech B.V. Netherlands) was used to evaluate the pervaporation performance of tubular CMS membranes. The feed fluid, which contained 10 wt % alcohol (methanol or ethanol), was heated to 70° C. The CMS membrane side faces the feed side (flow rate: 300 l/h and feed volume 2 L), while the permeate side was maintained at a pressure of 10 mbar by a vacuum pump. Water concentrations in feed liquid and permeate were determined by Karl Fischer titrations and refractive index (Mettler Toledo RA510M), respectively, under ambient conditions. The permeate stream was collected in a vacuum trap containing liquid nitrogen. The permeation flux J and separation factor αPα are calculated using formulas (3) and (4), respectively.

$$J = \frac{Q}{A \cdot t} \quad (3)$$

$$\alpha ij = \frac{Yi \cdot Xj}{Xi \cdot Yj} \quad (4)$$

J [g] is the weight of permeate collected during the time of experiment t [h], A [m²] is the effective membrane surface area, X and Y represent the mole fraction of components i and j in feed liquid and permeate, respectively. Pervaporation results are obtained after 1 day of continuous operation, which allows a more accurate comparison of fluxes and selectivities.

Membrane Characterization

FIG. 1(*a-c*) shows the photos of the α-$Al_2O_3$/γ-$Al_2O_3$-supported polyimide membrane before and after heat treatment at 700° C. in vacuum. After the composite support is immersed in the polyimide solution, a homogeneous yellow coating can be seen. The color of the coating changes from yellow to black during annealing at 700° C., indicating a pyrolysis process.

Figure 2:
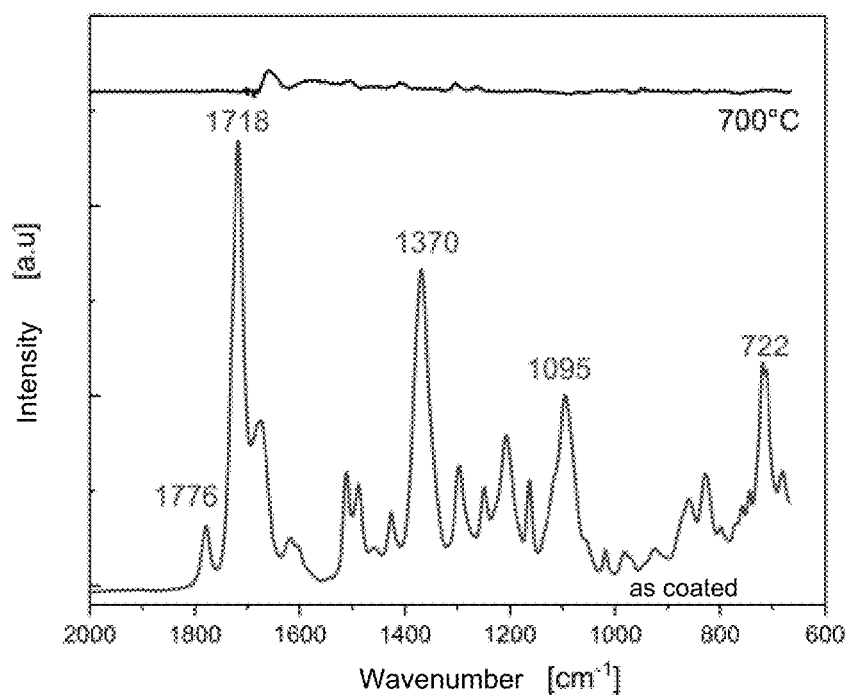
FIG. 2 shows ATR-FTIR spectra of an —$Al_2O_3$/$\gamma$-$Al_2O_3$-supported polyimide or CMS membrane according to the invention before (lower spectrum) and after (upper spectrum) pyrolysis at 700° C.

FIG. 2 shows the ATR-FTIR spectra of the supported membranes before and after heat treatment. The supported polymer membrane is characterized by the appearance of the peaks at 1776 cm$^{-1}$ (C=O asymmetric strain), 1720 cm$^{-1}$ (C=O symmetric strain), 1370 cm$^{-1}$ and 1095 (OC—N—CO strain) and 722 cm$^{-1}$ (C—N—C bending), which correspond to the characteristic absorption of the imide group. The intensity of these peaks decreases dramatically when the samples are treated at 700° C. This indicates that the pyrolysis degradation of the polymer is determined by the transformation of the imide groups.

The surface morphology and thickness of the CMS top layer were investigated by scanning electron microscopy. As can be seen in FIG. 3, a dense, uniform, smooth and crack-free carbon layer was formed with good adhesion to the γ-$Al_2O_3$ intermediate layer. The thickness of the CMS membrane is estimated to be about 350 nm based on the scanning electron microscope image of the section (FIG. 3-(*d*)).

The surface elemental composition of the polymer and CMS membrane determined by XPS is shown in Table 2 below.

TABLE 2

Surface elemental composition of a α-$Al_2O_3$/γ-$Al_2O_3$-supported polyimide membrane according to the invention before and after heat treatment at 700° C.

| Membrane | XPS analysis (at %) | | | O/C ratio (%) |
|---|---|---|---|---|
| | C1s | O1s | N1s | |
| As coated | 80.8 | 14.8 | 4.4 | 18.3 |
| 700° C. | 91.1 | 7.0 | 1.9 | 7.6 |

The oxygen to carbon ratio decreases from 18.3% to 7.6% after pyrolysis. In addition, 7 at. % and 1.9 at. % oxygen and nitrogen, respectively, are detected on the surface of the carbonized sample. This indicates the presence of oxygen and nitrogen-containing functional groups.

Figure 4:
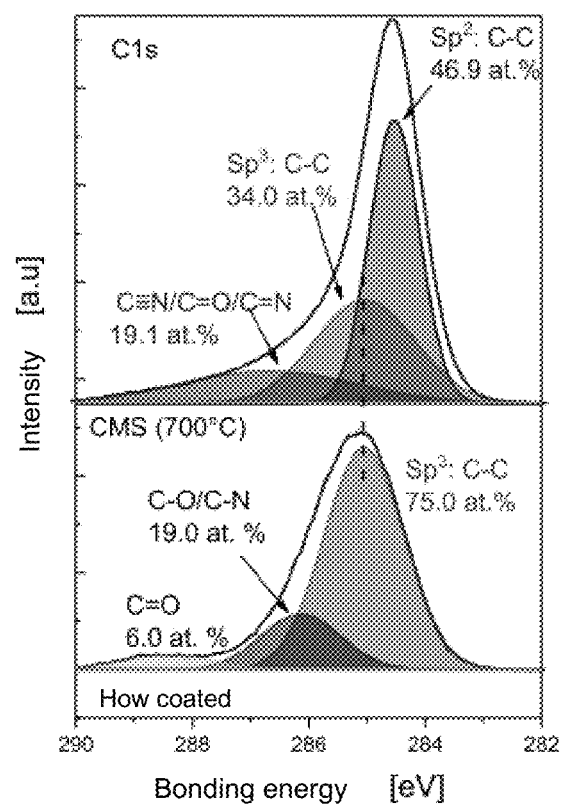
FIG. 4 shows C1s XPS spectra of an $\alpha$-$Al_2O_3$/$\gamma$-$Al_2O_3$-supported polyimide or CMS membrane according to the inventions before (upper graph) and after heat treatment at 700° C. (lower graph).

To gain deeper insight into the structural changes (electronic environments and bond structures) induced by the heat treatment, C1s XPS spectra of the polymeric and carbonized samples were deconvoluted using a model based on a set of Gaussian-Lorentzian functions, as shown in FIG. 4. The supported polyimide membrane shows three contributions centered at 285.0, 285.9, and 288.5 eV, corresponding to the C—C (sp³) bond of an aromatic ring not bonded to imide rings, and C—N and C=O bonds within imide rings.

Figure 12:
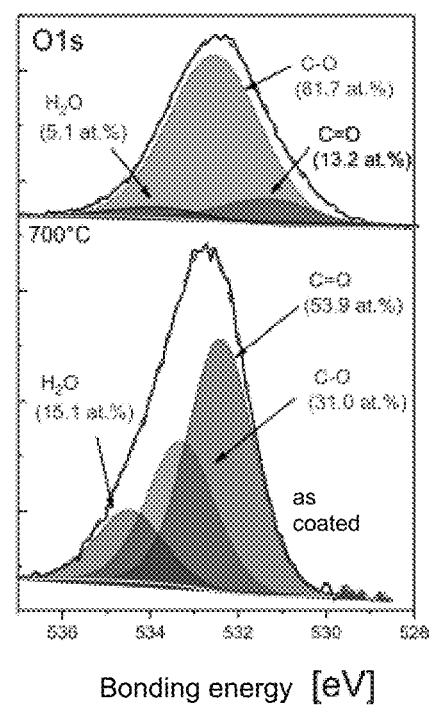
FIG. 12 presents O1s XPS spectra of an $\alpha$-$Al_2O_3$/$\gamma$-$Al_2O_3$-supported polyimide or CMS membrane according to the invention $\alpha$ before (lower graph) and after (upper graph) heat treatment at 700° C., respectively.

The C—N bond is also confirmed by a single broad peak at about 400.3 eV from N1s nuclear level spectra (FIG. 10). Three peaks are found in the O1s spectrum (FIG. 12), representing C=O (531.3 eV), C—O (532.5 eV), and O—H (533.8 eV), respectively.

The presence of graphitic carbon after pyrolysis is indicated in the C1s spectrum (FIG. 4) by the appearance of a peak at 284.5 eV (47 at. %), corresponding to C=C bonding in an sp² network.

The presence of non-graphitic carbon is confirmed by the peak at 285 eV corresponding to the C—C bond (sp³) and a broad peak at 287 eV due to nitrogen and oxygen containing functional groups such as C—N, C=N, C≡N, C=O, and C—O.

Figure 11:
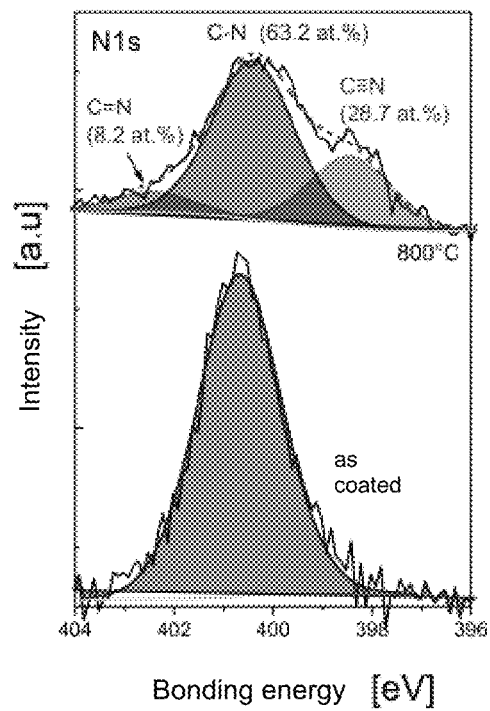
FIG. 11 presents N1s XPS spectra of an $\alpha$-$Al_2O_3$/$\gamma$-$Al_2O_3$ supported polyimide or CMS membrane according to the invention before (upper figure) and after (lower figure) heat treatment at 700° C., respectively.

Note that the presence of these functional groups after heat treatment is also confirmed by the deconvolution of the N1s (FIG. 11) and O1s (FIG. 12) spectra, respectively.

Based on XPS analysis, the carbon membrane of the invention is a mixture of graphitic and amorphous carbon. The latter represents "defects" within or at the edge of the graphitic layers.

"Defects" mentioned in this context are not to be confused with defects of the CMS membrane in the sense of "defect-free", but refer here exclusively to the electronic configuration of the layers.

Figure 5:
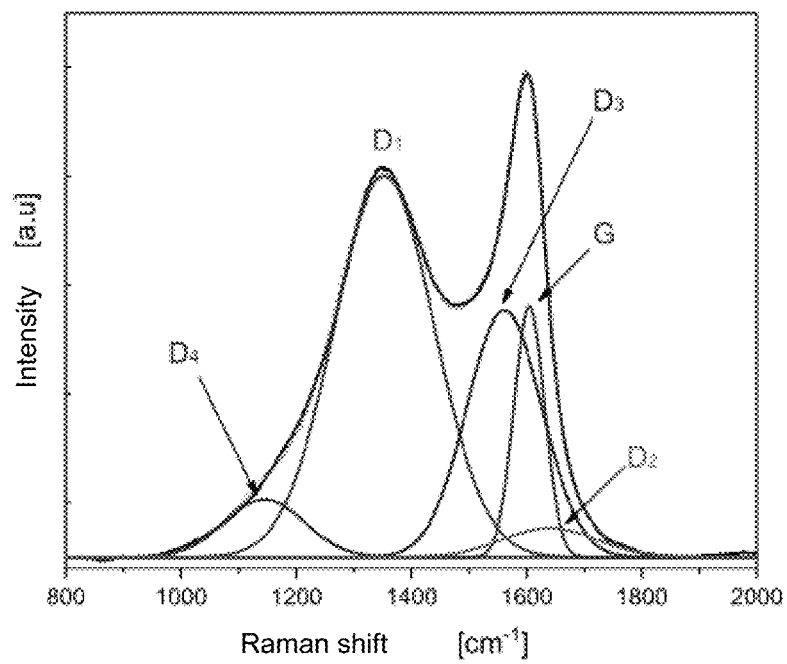
FIG. 5 presents a Raman spectrum of an $\alpha$-$Al_2O_3$/$\gamma$-$Al_2O_3$-supported CMS membrane according to the invention.

The nature or type of (electronic) defects in the graphitic layers of the CMS membrane is investigated by Raman spectroscopy. As shown in FIG. 5, the Raman spectrum of the carbonized sample is fitted using five Gaussian contributions. The peak centered at 1600 cm$^{-1}$ is defined as the G band and is attributed to the in-plane stretching mode of E 2 g symmetry at sp² sites. This band is observed exclusively in perfectly infinite graphitic planes as in single crystal graphite. When defects are present within the graphene planes, the D1 band becomes Raman-active due to the activation of the breathing mode of carbon rings of A 1 g symmetry at the edge of graphite planes. The D2 peak at 1635 cm$^{-1}$ is associated with lattice vibrations as in D1, but involves isolated graphene layers. D3 and D4 bands generally occur in highly defective carbonaceous materials. The first at 1560 cm$^{-1}$ is usually broad and attributed to amorphous carbon, while the second at 1150 cm$^{-1}$ is attributed to sp³ impurities. Eckmann et al. (Eckmann, A.; Felten, A.; Mishchenko, A.; Britnell, L.; Krupke, R.; Novoselov, K. S.; Casiraghi, C., Probing the Nature of Defects in Graphene by Raman Spectroscopy. Nano Letters 2012, 12 (8), 3925-3930) used Raman spectroscopy to investigate the intensity ratio of D1 and D2 peaks (ID 1/ID 2) to determine the nature of defects in graphene samples introduced by fluorination (sp³-like defects) and Ar⁺ bombardment (vacancy-like defects). They found an ID 1/ID 2 ratio of about 13 for defects related to sp³ hybridization and 7 for vacancy-like defects. According to the invention, the calculated ID 1/ID 2 intensity ratio is estimated to be about 13.15, indicating that most of the defects in the carbonized sample according to the invention are $sp^3$-like defects. This result is in agreement with the XPS analysis, which showed that 34 at. % of the total amount of carbon is related to $sp^3$ hybridization.

Gas Separation Performance

Figure 13:
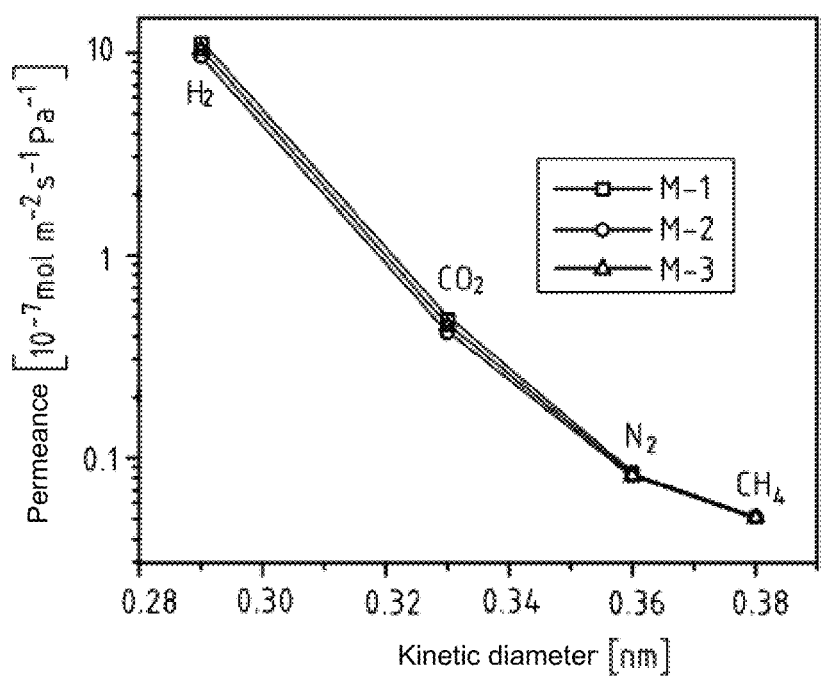
FIG. 13 shows the single gas permeation through an $\alpha$-$Al_2O_3$/$\gamma$-$Al_2O_3$-supported CMS membrane according to the invention within one batch, tested at 200° C. at a feed pressure of 2 bar. The gas permeances were measured for three samples with a deviation of less than 5%.

The gas separation performance of tubular CMS membranes was evaluated by measuring the permeance of several gases with different kinetic diameters at 200° C. and an inlet pressure of 2 bar differential. Three membranes from different batches were tested to ensure the reliability of the results (FIG. 13 and table). As shown in FIG. 6, the permeance values of the selected gases increase with decreasing kinetic diameter, i.e., $CH_4$ (0.38 nm)>$N_2$ (0.365 nm)>$CO_2$ (0.33 nm)>$H_2$ (0.29 nm). This indicates that the transport of these gases across the CMS membrane is controlled by the molecular sieving mechanism.

By measuring the temperature dependence of gas permeances through the CMS membrane, important information about gas transport behavior can be obtained. As shown in FIG. 7A, the permeation of all gases increases with temperature. For example, $H_2$ exhibits the highest permeance, increasing by almost an order of magnitude in the range of 50 to 200° C. The permselectivity of all gas pairs also increases with increasing temperature (FIG. 7B). At 200° C., the CMS membrane exhibits permselectivities of about 24, 130, and 228 for $H_2/CO_2$, $H_2/N_2$, and $H_2/CH_4$ gas pairs, respectively, which are well above the corresponding Knudsen coefficients (4.7, 3.7, and 2.8). Such excellent permselectivities demonstrate the pinhole (defect) free nature of the CMS membranes of the invention and are attributed to the presence of ultramicropores that prevent the diffusion of larger gas molecules such as $N_2$ and $CH_4$. Therefore, it can be assumed that the pore size of the CMS membrane of the invention is close to the kinetic diameter of $CO_2$, i.e., 0.33 nm.

The apparent activation energy $E_{act}$ for the permeation of $H_2$, $CO_2$, $N_2$, and $CH_4$ through the CMS membrane of the invention was calculated from the Arrhenius temperature dependence of permeation.

Figure 14:
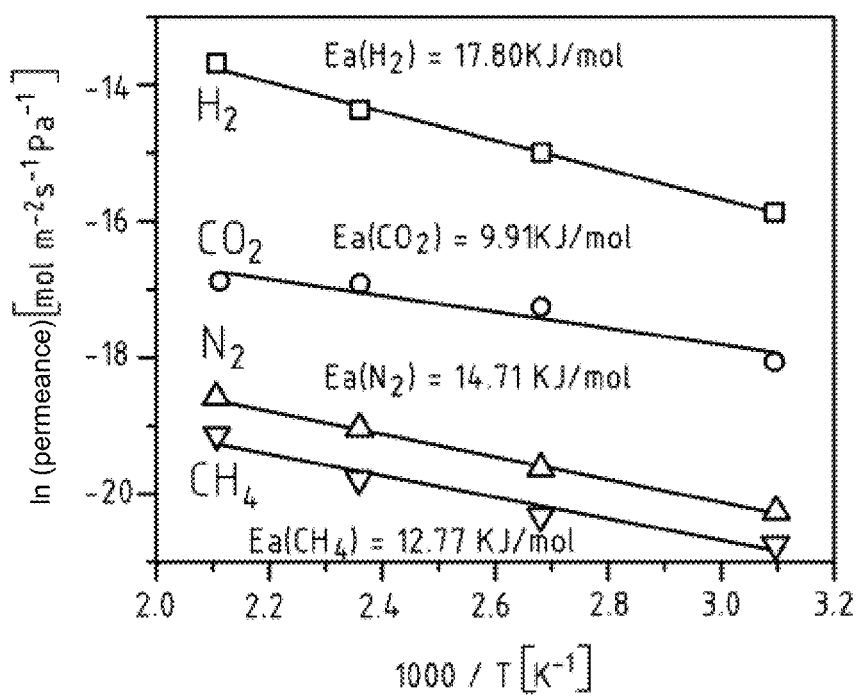
FIG. 14 is an Arrhenius plot for the permeance of $H_2$, $CO_2$, $N_2$, and $CH_4$ through an $\alpha$-$Al_2O_3$/$\gamma$-$Al_2O_3$-supported CMS membrane according to the invention.
Figure 15:
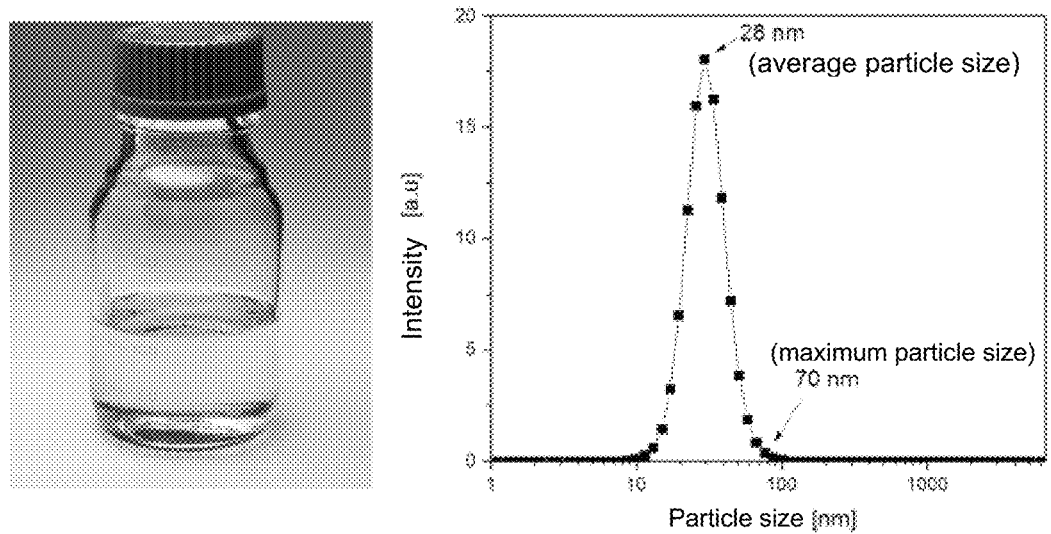
FIG. 15 (A) is a photograph of a 2 wt % solution of the Alfa Aesar polyimide in NMP and (B) is a plot of the particle size distribution of the polymer solution as determined by dynamic light scattering.

Excellent linear fits were obtained for all samples with the resulting $E_{act}$ in FIG. 14. The highest $E_{act}$ value, 17.8 kJ/mol, is obtained for $H_2$, while the lowest value, 9.9 kJ/mol, corresponds to the permeation of $CO_2$. This means that the CMS membrane can show excellent $H_2/CO_2$ separation performance at elevated temperatures. It should be noted that the $E_{act}$ for $H_2$ obtained according to the invention is comparable to those reported for silica and graphene membranes.

Figure 8:
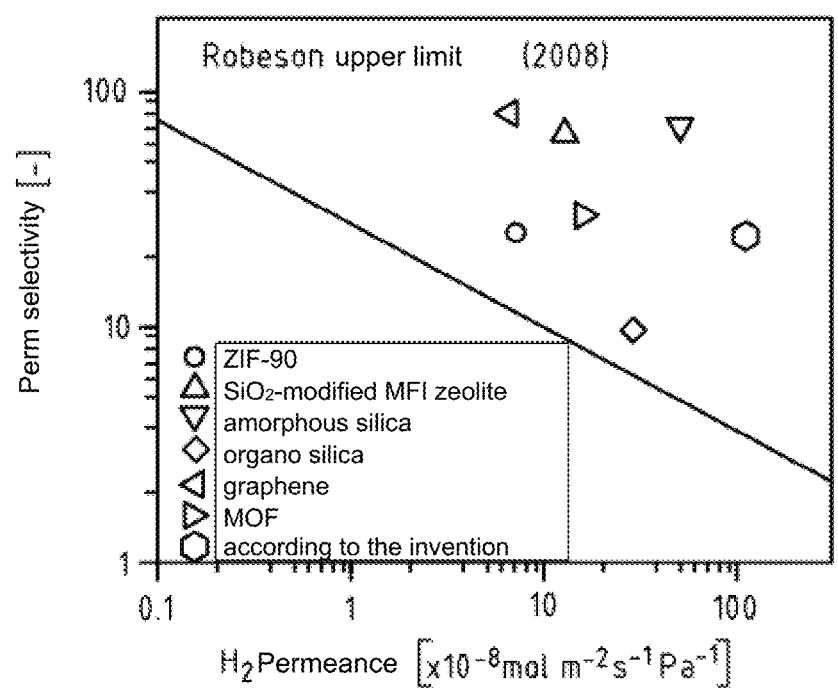
FIG. 8 is the comparative plot of the $H_2/CO_2$ separation performance of an $\alpha$-$Al_2O_3$/$\gamma$-$Al_2O_3$-supported CMS membrane according to the invention with known inorganic membranes in the temperature range from 150 to 200° C. The solid line represents the upper Robeson limit of the polymer.

The $H_2/CO_2$ separation performance of the carbon membrane of the invention was further compared with other state-of-the-art materials such as MOF (Metal Organic Framework), ZIF 38 (Zeolitic Imidolate Framework), silica-modified zeolite, silica and graphene (FIG. 8). The solid line represents the Robeson upper limit between $H_2$ permeance and $H_2/CO_2$ selectivity for polymer membranes, at a membrane thickness of 50 μm. The $H_2/CO_2$ selectivity of the carbon membrane of the invention is well above the compromise curve and is exceeded only by amorphous silica, silica-modified MFI zeolite, and graphene. However, all of these membranes exhibit relatively low $H_2$ permeance compared to the CMS membrane of the invention. For example, the membrane developed by van Gestel et al. (Van Gestel, T.; Barthel, J., New types of graphene-based membranes with molecular sieve properties for He, $H_2$ and $H_2O$. Journal of Membrane Science 2018, 554, 378-384) developed graphene membrane exhibits the highest $H_2/CO_2$ permselectivity (about 80) due to the perfect layered structure of graphene planes, which restricts the diffusion of $CO_2$. Nevertheless, the $H_2$ permeance, $6.7 \times 10^{-8}$ mol m$^{-2}$ s$^{-1}$ Pa$^{-1}$, is more than an order of magnitude lower than that of the carbon membrane of the invention ($1.1 \times 10^{-6}$ mol m$^{-2}$ s$^{-1}$ Pa$^{-1}$). The increased $H_2$ permeance of the carbon membrane of the invention can be attributed to the presence of $sp^3$-like defects in the graphene planes, which allows faster diffusion of $H_2$. From these results, it can be concluded that the carbon membrane according to the invention has both high $H_2/CO_2$ selectivity and high $H_2$ permeance, which are important performance parameters for industrial application.

The measured permselectivities at different gas mixtures of the α-$Al_2O_3$/γ-$Al_2O_3$-supported CMS membrane according to the invention (3 samples M-1 to M-3 from one batch, measured at 200° V with a feed pressure of 2 bar) are summarized in Table 5 below. The results are shown graphically in FIG. 13.

TABLE 5

Permselectivities of the α-$Al_2O_3$/γ-$Al_2O_3$-supported CMS membranes according to the invention.

| Permeance ratio | M-1 | M-2 | M-3 | Knudsen selectivity |
|---|---|---|---|---|
| $H_2/CO_2$ | 23.30 | 24.06 | 23.65 | 4.67 |
| $H_2/N_2$ | 129.70 | 113.94 | 121.44 | 3.73 |
| $H_2/CH_4$ | 227.74 | 195.06 | 211 | 2.8 |

TABLE 6

Single gas permeation through a CMS membrane heat treated at 600° C. (CMS-600) and a CMS membrane heat treated at 700° C. (CMS-700) at different temperatures.

| Membrane | T [° C.] | Permeance [m³/m² h bar] | | | | Permeance ratio | | |
|---|---|---|---|---|---|---|---|---|
| | | $H_2$ | $CO_2$ | $N_2$ | $CH_4$ | $H_2/CO_2$ | $H_2/CH_4$ | $CO_2/CH_4$ |
| CMS-600 | 50 | 2.19 | 0.93 | 0.032 | 0.027 | 2.3 | 78.8 | 33.4 |
| | 100 | 12.7 | 5.38 | 0.47 | 0.24 | 2.3 | 51.9 | 22.1 |
| | 150 | 27.41 | 10.83 | 2.06 | 1.56 | 2.5 | 17.6 | 6.9 |
| | 200 | 47.24 | 15.34 | 4.81 | 3.96 | 3.1 | 11.9 | 3.8 |
| CMS-700 | 50 | 0.99 | 0.12 | 0.012 | 0.0079 | 8.2 | 125.3 | 15.2 |
| | 100 | 2.44 | 0.25 | 0.023 | 0.012 | 9.8 | 203.3 | 20.8 |
| | 150 | 4.73 | 0.34 | 0.042 | 0.021 | 13.9 | 225.3 | 16.2 |
| | 200 | 8.87 | 0.38 | 0.068 | 0.038 | 23.3 | 233.4 | 10 |

From the data in Table 6, the supported CMS membrane heat-treated at 600° C. according to the invention is well suited for separation of $CO_2/CH_4$ at low temperatures, while the CMS membrane heat-treated at 700° C. appears favorable for $H_2/CO_2$ separation and $H_2/CH_4$ separation at high temperatures.

Pervaporation Power

Figure 9:
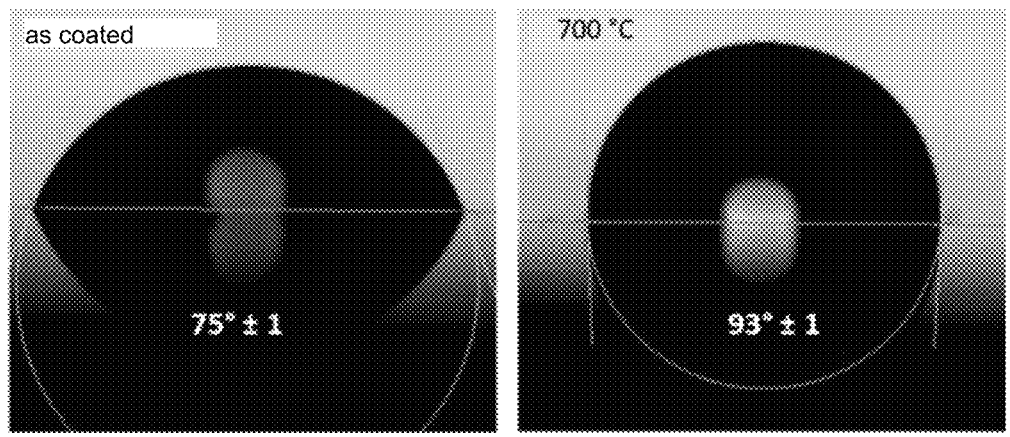
FIG. 9 shows representative shapes and water contact angles of water droplets on an $\alpha$-$Al_2O_3$/$\gamma$-$Al_2O_3$-supported polyimide or CMS membrane according to the invention before (left figure) and after (right figure) heat treatment, respectively.

The surface wettability of the membrane surface to water can be easily estimated by measuring the water contact angle. The water angle of the polymer membrane before and after heat treatment is shown in FIG. 9. The untreated membrane has a contact angle of about 75° before pyrolysis, which increases to about 90° after heat treatment. This is attributed to the increase in carbon content, which makes the membrane more hydrophobic. It should be noted that water contact angles in the range of 95-100° have been reported in the literature for graphene. The lower contact angle measured for the CMS membrane of the invention compared to graphene is partly due to the presence of some oxygen-containing functional groups (7 at. %) on the membrane surface, as mentioned above.

Table 3 below summarizes the pervaporation results for 10 wt % aqueous binary liquid feeds through the CMS membrane of the invention at 70° C. Methanol and ethanol were used as feed solutions due to their different molecular sizes. Pervaporation results are obtained after one day of continuous operation, which allows a more accurate comparison of fluxes and selectivities.

TABLE 3

Pervaporation results of $H_2O$/alcohol (10/90 wt %) through the $\alpha$-$Al_2O_3$/$\gamma$-$Al_2O_3$-supported CMS membrane according to the invention at 70° C.

| Alcohol | Molecule size [nm] | $H_2O$ permeate [wt. %] | $J_{H2O}$ [g/m²h] | $J_{Alcohol}$ [g/m²h] | $\alpha_{H2O/Alcohol}$ |
|---|---|---|---|---|---|
| Methanol | 0.38 | 99.0 | 527.5 | 5.3 | 791 |
| Ethanol | 0.42 | 99.5 | 541.8 | 2.7 | 1946 |

It can be seen from Table 3 that the separation factor increases with the molecular size of the alcohol. This confirms the excellent molecular sieving properties of the carbon membranes according to the invention.

Table 4 compares the pervaporation performance for methanol dehydration of the carbon membrane of the invention with NaA zeolite, silica and carbon membranes. The pervaporation index (PSI) is used as an indicator of the performance of the synthesized membrane. The data given in Table 4 were taken from documents (a) to (f) given below.

TABLE 4

Comparison of pervaporation membranes according to the invention and those known from the literature when used in the dehydration of aqueous methanol.

| Membrane | Supply $H_2O$ [wt. %] | T [° C.] | $J_{total}$ [kg/m²h] | $\alpha$ | PSI* [kg/m²h] | Ref. |
|---|---|---|---|---|---|---|
| Carbon¹, tubular | 10 | 50 | 0.13 | 65 | 8 | a) |
| Carbon hollow fiber² | 10 | 60 | 0.32 | 11 | 3 | b) |
| Silica (Pervatech) tubular | 15 | 50 | 0.70 | 7 | 4 | c) |
| Silica (ECN) tubular | 10 | 90 | 2.20 | 55 | 119 | d) |
| Silica tubular | 2 | 60 | 0.06 | 200 | 12 | e) |
| NaA zeolite tubular | 70 | 60 | 1.8 | 140 | 250 | f) |
| Carbon tubular | 10 | 70 | 0.529 | 791 | 418 | According to the invention |

PSI = $J_{total} \times (\alpha - 1)$
¹from resorcinol
²from poly(phenylene oxide)

References Given in Table 4:
a) Tanaka, S.; Yasuda, T.; Katayama, Y.; Miyake, Y., Pervaporation dehydration performance of microporous carbon membranes prepared from resorcinol/formaldehyde polymer. Journal of Membrane Science 2011, 379 (1-2), 52-59
b) Yoshimune, M.; Mizoguchi, K.; Haraya, K., Alcohol dehydration by pervaporation using a carbon hollow fiber membrane derived from sulfonated poly(phenylene oxide). Journal of Membrane Science 2013, 425, 149-155
c) ten Elshof, J. E.; Abadal, C. R.; Sekulic, J.; Chowdhury, S. R.; Blank, D. H. A., Transport mechanisms of water and organic solvents through microporous silica in the pervaporation of binary liquids. Microporous and Mesoporous Materials 2003, 65 (2-3), 197-208
d) Sommer, S. Melin, T., Influence of operation parameters on the separation of mixtures by pervaporation and vapor permeation with inorganic membranes. Part 1: Dehydration of solvents. Chemical Engineering Science 2005, 60 (16), 4509-4523
(e) Vangemert, R., W., Cuperus, F. P., NEWLY DEVELOPED CERAMIC MEMBRANES FOR DEHYDRATION AND SEPARATION OF ORGANIC MIXTURES BY PERVAPORATION. Journal of Membrane Science 1995, 105 (3), 287-291.
f) Shah, D.; Kissick, K.; Ghorpade, A.; Hannah, R.; Bhattacharyya, D., Pervaporation of alcohol-water and dimethylformamide-water mixtures using hydrophilic zeolite NaA membranes: mechanisms and experimental results. Journal of Membrane Science 2000, 179 (1-2), 185-205

The CMS membrane according to the invention has a lower water flux than the hydrophilic membranes, including NaA-type zeolite and silica membranes, but the highest separation factor and PSI. This means that despite its hydrophobic character, the CMS membrane according to the invention can effectively separate water from aqueous alcohol mixtures based on the molecular sieve mechanism.

The invention claimed is:

1. A supported CMS membrane comprising a CMS membrane obtainable from a polyimide by pyrolysis and a porous support, wherein;
   a mesoporous intermediate layer is provided between the CMS membrane and the porous support,
   the polyimide is composed of the monomers 1-(4-aminophenyl)-1,3,3-trimethyl-2H-inden-5-amine and 5-(1,3- dioxo-2-benzofuran-5-carbonyl-2-benzofuran-1,3-dione of the following formulae:

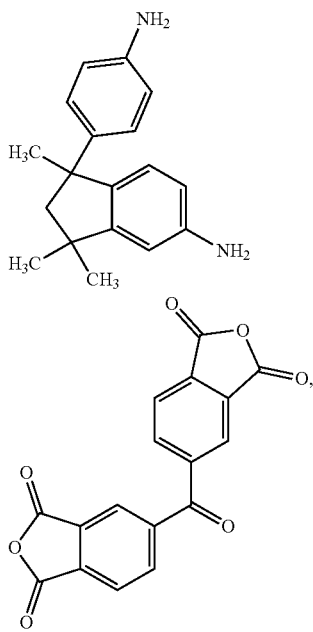

the pores in the mesoporous intermediate layer have an average pore diameter of 3 to 6 nm, determined by porosimetry of the final supported membrane,
the pores in the porous support have an average pore diameter of 60 to 90 nm, determined by scanning electron microscopy,
the polyimide is a polyimide of CAS No. 62929-02-6, and
the CMS membrane has a pore size in the range of the kinetic diameter of $CO_2$ of 0.33 nm.

2. A process for preparing the supported CMS membrane according to claim 1, comprising the following steps:
  i) applying a suitable precursor sol to the porous support,
  ii) calcining, thereby forming the mesoporous intermediate layer,
  iii) applying the polyimide by dip coating followed by drying,
  iv) pyrolysis, and
  v) cooling to room temperature.

3. The process according to claim 2, wherein:
  steps i) and ii) are each repeated once, and
  calcining is carried out at 500 to 700° C. in air, and/or
  the pyrolysis is carried out in vacuum at $10^{-5}$ to $10^{-7}$ mbar and by step-wise heating.

4. The process according to claim 2, wherein the immersion and removal during dip coating in step iii) is carried out at a speed of 5 to 15 mm/s and the immersion time is 10 to 30 s and/or a solution of the polyimide in N-methyl-2-pyrrolidone is used.

5. A method of use of the supported CMS membrane according to claim 1 for the separation of gas mixtures or for the separation of liquid mixtures comprising:
  applying a gas mixture or a liquid mixture to the supported CMS membrane, and
  collecting retentate and permeate from the supported CMS membrane separately.

6. The method according to claim 5, wherein the gas mixtures are $H_2/CO_2$ or $H_2/CH_4$ mixtures.

7. The method according to claim 5, wherein:
  the fluid mixture comprises one or more alcohols, and
  the method is used for dehydration of the one or more alcohols.

8. The method according to claim 7, wherein the one or more alcohols comprise methanol or ethanol.

9. An apparatus for gas separation or for liquid separation, comprising the supported CMS membrane according to claim 1.

* * * * *